(12) United States Patent
Reid et al.

(10) Patent No.: US 7,313,914 B1
(45) Date of Patent: Jan. 1, 2008

(54) ACTUATOR ASSEMBLY FOR HYDRAULIC DRIVE APPARATUS

(75) Inventors: Bruce E. Reid, Sullivan, IL (US); Nathan W. Bonny, Shelbyville, IL (US); Scott W. Keller, Charleston, IL (US); Danny Ray Harrison, Shelbyville, IL (US)

(73) Assignee: Hydro-Gear Limited Partnership, Sullivan, IL (US)

( * ) Notice: Subject to any disclaimer, the term of this patent is extended or adjusted under 35 U.S.C. 154(b) by 83 days.

(21) Appl. No.: 11/372,915

(22) Filed: Mar. 10, 2006

(51) Int. Cl.
F16H 61/42 (2006.01)
B60K 17/10 (2006.01)
(52) U.S. Cl. ..................................... 60/487
(58) Field of Classification Search .............. 60/389, 60/399, 487
See application file for complete search history.

(56) References Cited

U.S. PATENT DOCUMENTS

| | | | |
|---|---|---|---|
| 2,754,384 A | 7/1956 | Atkinson | |
| 3,827,024 A | 7/1974 | Anderson et al. | |
| 3,984,967 A | 10/1976 | Jones | |
| 3,999,643 A | 12/1976 | Jones | |
| 4,231,217 A | 11/1980 | Lucas | |
| 5,079,969 A | 1/1992 | Kato et al. | |
| 5,314,038 A | 5/1994 | Peterson, Jr. | |
| 5,436,419 A | 7/1995 | Welscher et al. | |
| 5,438,831 A | 8/1995 | Okada | |
| 5,586,955 A * | 12/1996 | Wanie ......................... | 477/99 |
| 5,601,512 A | 2/1997 | Scag | |
| 5,994,857 A | 11/1999 | Peterson, Jr. et al. | |
| 6,026,634 A | 2/2000 | Peter et al. | |
| 6,085,502 A | 7/2000 | Wians et al. | |
| 6,105,348 A | 8/2000 | Turk et al. | |
| 6,109,009 A | 8/2000 | Benson | |
| 6,109,010 A | 8/2000 | Heal et al. | |
| 6,339,916 B1 | 1/2002 | Benson | |
| 6,405,513 B1 | 6/2002 | Hancock et al. | |
| 6,510,838 B2 | 1/2003 | Hur | |
| 6,568,162 B2 | 5/2003 | Walters | |
| 6,591,594 B2 | 7/2003 | Hancock et al. | |
| 6,625,963 B2 | 9/2003 | Johnson | |
| 6,698,198 B1 * | 3/2004 | Schreier ...................... | 60/487 |
| 6,880,686 B1 | 4/2005 | Hauser et al. | |
| 6,886,315 B1 | 5/2005 | Hauser et al. | |
| 6,935,106 B2 * | 8/2005 | Korthals ...................... | 60/487 |
| 6,951,093 B1 | 10/2005 | Hauser et al. | |
| 7,017,326 B1 | 3/2006 | Keller et al. | |
| 7,131,267 B1 * | 11/2006 | Keller et al. .................. | 60/399 |
| 2002/0005780 A1 | 1/2002 | Ehrlich et al. | |
| 2004/0088960 A1 | 5/2004 | Johnson | |
| 2004/0103659 A1 | 6/2004 | Johnson et al. | |
| 2004/0124026 A1 | 7/2004 | Walters et al. | |

* cited by examiner

Primary Examiner—Thomas E. Lazo
(74) Attorney, Agent, or Firm—Neal, Gerber & Eisenberg LLP

(57) ABSTRACT

A hydraulic drive apparatus having an actuator assembly mounted on a control device is disclosed. The hydraulic drive apparatus comprises an input, a hydraulic pump, a control device, and an actuator assembly. The hydraulic drive apparatus is mounted on a vehicle that comprises an operating system. A prime mover drives the input, which subsequently drives one or more axle shafts. The transmission is capable of operation in forward and reverse directions. The control device determines the direction of operation and speed of the transmission. The actuator assembly is mounted to a component of the control device. The actuator assembly determines the state of operation of the output device with respect to the forward or reverse operation of the transmission.

29 Claims, 21 Drawing Sheets

ACTUATOR ASSEMBLY FOR HYDRAULIC DRIVE APPARATUS

BACKGROUND OF THE INVENTION

This invention relates generally to an actuator assembly that may enable or disable a powered device of a vehicle such as a tractor. The invention herein is disclosed in connection with a tractor using an integrated hydrostatic transaxle. It will be understood that this invention can be used with any drive apparatus where a control device is used to adjust an internal swash plate to modify output of a hydraulic pump.

Integrated hydrostatic transaxles ("IHTs") and switches are well known in the art and are more fully described in, among others, U.S. Pat. Nos. 5,314,387 and 6,951,093, and in U.S. Pat. Nos. 7,032,377 and 7,131,267, the terms of which are incorporated herein by reference. It is also known to use external control devices on IHTs. The external control device of this invention is similar to the control device depicted in U.S. Pat. No. 6,880,333, which is incorporated herein in its entirety by reference.

SUMMARY OF THE INVENTION

The invention disclosed herein comprises an actuator assembly that may be used to enable or disable a powered device depending on the direction an associated control device is moved.

A better understanding of the present invention will be obtained from the following detailed descriptions and accompanying drawings, which set forth illustrative embodiments that are indicative of the various ways in which the principles of the invention may be employed. The features disclosed herein can be combined to create a unique design; it is understood, however, that such features are unique in their own right and can be used independently with other transmission, transaxle or vehicle designs. Other benefits and objects of this invention are disclosed herein and will be obvious to readers of ordinary skill in the art.

DETAILED DESCRIPTION OF THE DRAWINGS

As noted above, this invention is described herein with respect to a vehicle including an integrated hydrostatic transaxle, but it will be understood that this invention is not limited to such an application. It is contemplated that the present invention can also be used with other drive apparatus designs where a control arm is used to modify the output of a hydraulic pump. Identical structure in different embodiments is given identical numerals throughout; where appropriate, different prefixes are used to differentiate between structures that are similar but not identical.

Figure 1:
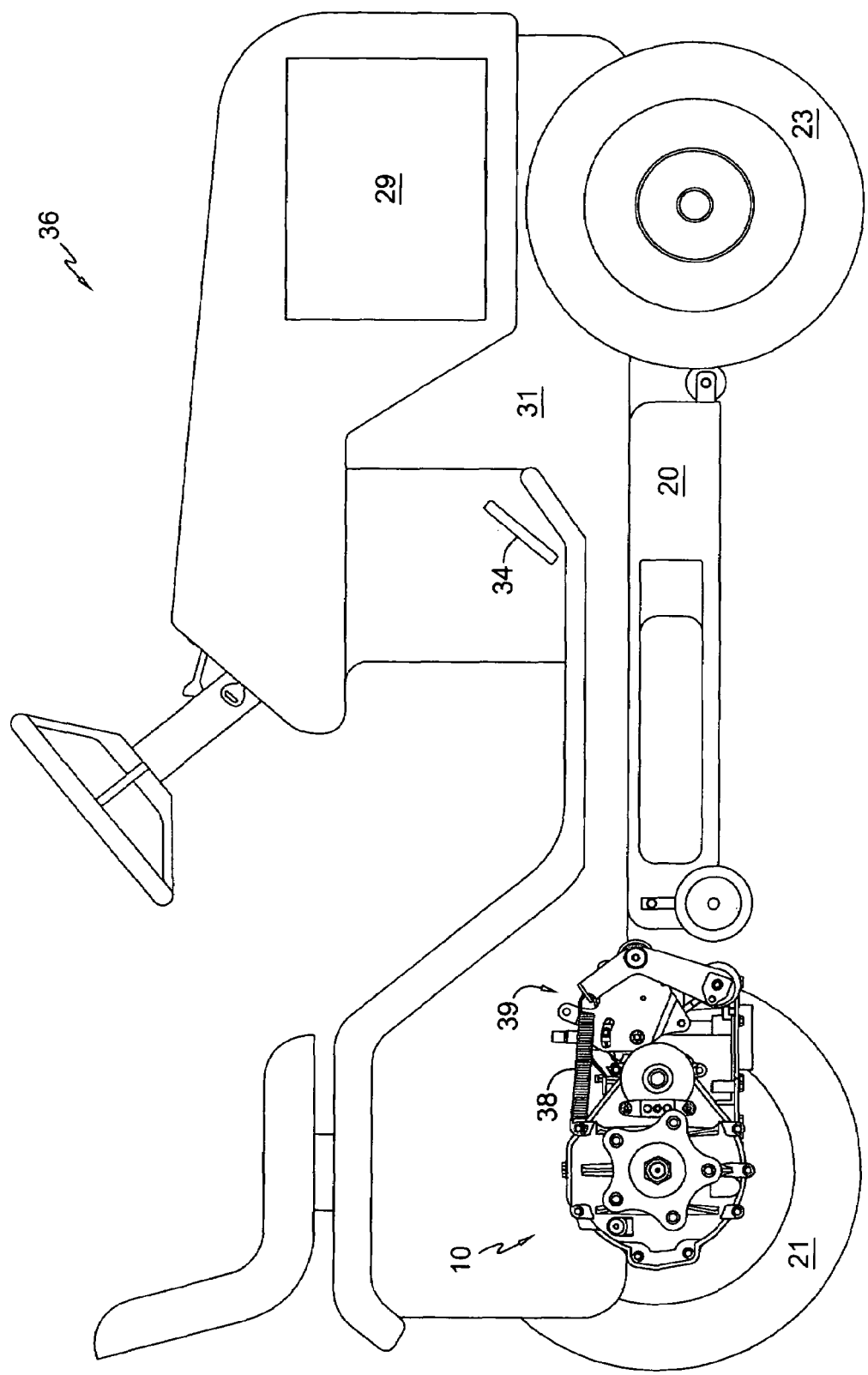
FIG. 1 is a side view of a vehicle including a transaxle incorporating an embodiment of the present invention.

The embodiment depicted in FIG. 1 shows a typical vehicle 36 having a prime mover or engine 29 mounted on a vehicle frame 31, rear drive wheels 21 and front steering wheels 23; one of rear drive wheels 21 has been removed from this figure for clarity. Mower deck 20 may also be provided on vehicle 36. Each of these elements and accompanying interconnections are well known in the art and will not be described in detail.

In the depicted embodiment, exemplary hydrostatic transaxle 10 is mounted towards the rear of vehicle 36 to power both drive wheels 21. Hydrostatic transaxle 10 is shown in more detail in FIGS. 2 and 3. Hydrostatic transaxle 10, as depicted herein, is similar to that shown in U.S. Pat. No. 6,253,637, the terms of which are incorporated herein by reference in its entirety. However, it will be appreciated that the use of other hydrostatic transaxles is within the scope of the present invention. Hydrostatic transaxles, such as hydrostatic transaxle 10, are well known in the art and will only generally be described here. The depicted embodiment of hydrostatic transaxle 10 comprises hydraulic and gear elements located inside transmission housing 11. Transmission housing 11 has been removed in FIG. 3 so that the internal interaction of pump assembly 14, swash plate 18, trunnion arm 16 and hydraulic motor 24 can be seen. Generally, pump assembly 14 is mounted on center section 22 and driven by input shaft 12. Pump assembly 14 is hydraulically connected to hydraulic motor 24, also mounted on center section 22, through hydraulic porting (not shown) formed in center section 22. Hydraulic motor 24 in turn drives motor shaft 26 which transmits power through gear 27 to gear train 28, driving output axles 30. Swash plate 18 is proximate to pump assembly 14 such that the angular movement of swash plate 18 regulates the hydraulic output of pump assembly 14, which in turn controls the direction and speed of hydraulic motor 24.

As depicted in, for example, FIGS. 1-5, swash plate 18 is rotated by trunnion arm 16. To aid a user in rotating swash plate 18 with trunnion arm 16, control arm 40 of control device 39 may be mounted on trunnion arm 16. In the depicted embodiment, control device 39 comprises control arm 40 and return-to-neutral mechanism 43, with return-to-neutral mechanism 43 comprising return arm 42, retainer assembly 33, bias spring 38, bearing 55 and bearing retainer 56. Control devices are generally well known in the art, and it will be obvious that any number of configurations of control device 39 fall within the scope of the present invention.

In the depicted embodiment, control arm 40 is connected to a regulating device, such as pedal 34, provided on vehicle 36. Movement of pedal 34 is translated to control arm 40 through linkage (not shown), which in turn causes rotation of trunnion arm 16 and angular movement of swash plate 18.

As is generally known, swash plate 18 has a neutral position, and may be rotated to a plurality of forward positions, as well as a plurality of reverse positions, wherein any of the plurality of forward positions may equate to forward travel of vehicle 36, while any of the plurality of reverse positions may equate to the reverse travel of vehicle 36. In the neutral position, swash plate 18 is positioned for minimal fluid displacement of pump assembly 14. When swash plate 18 is rotated to any of the plurality of forward positions, pump assembly 14 displaces hydraulic fluid so as to cause rotation of hydraulic motor 24, and thus movement of gear train 28 and axles 30, in a forward direction, relative to vehicle 36. Similarly, when swash plate 18 is rotated to any of the plurality of reverse positions, vehicle 36 will be propelled in a reverse direction. As control arm 40 is coupled with swash plate 18 through trunnion arm 16, control arm 40 also has a neutral position, a plurality of forward positions and a plurality of reverse positions, each of which corresponds to the positions of swash plate 18, respectively. For the purposes of this discussion, a forward position of a control arm or swash plate corresponds to forward travel of vehicle 36, but does not necessarily specify the direction of movement of a control arm or swash plate with respect to vehicle 36.

Figure 2:
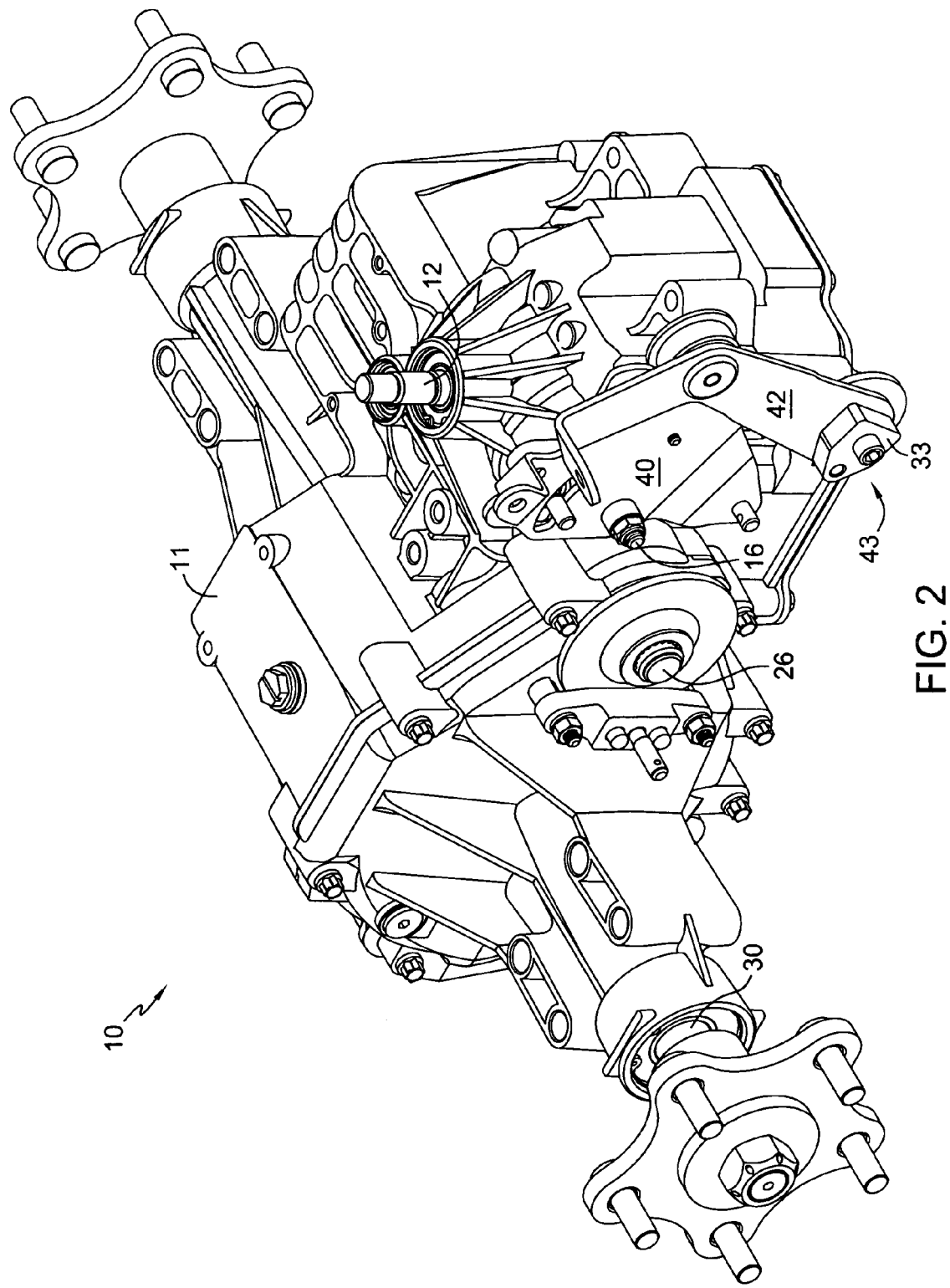
FIG. 2 is a perspective view of the transaxle shown in FIG. 1.
Figure 3:
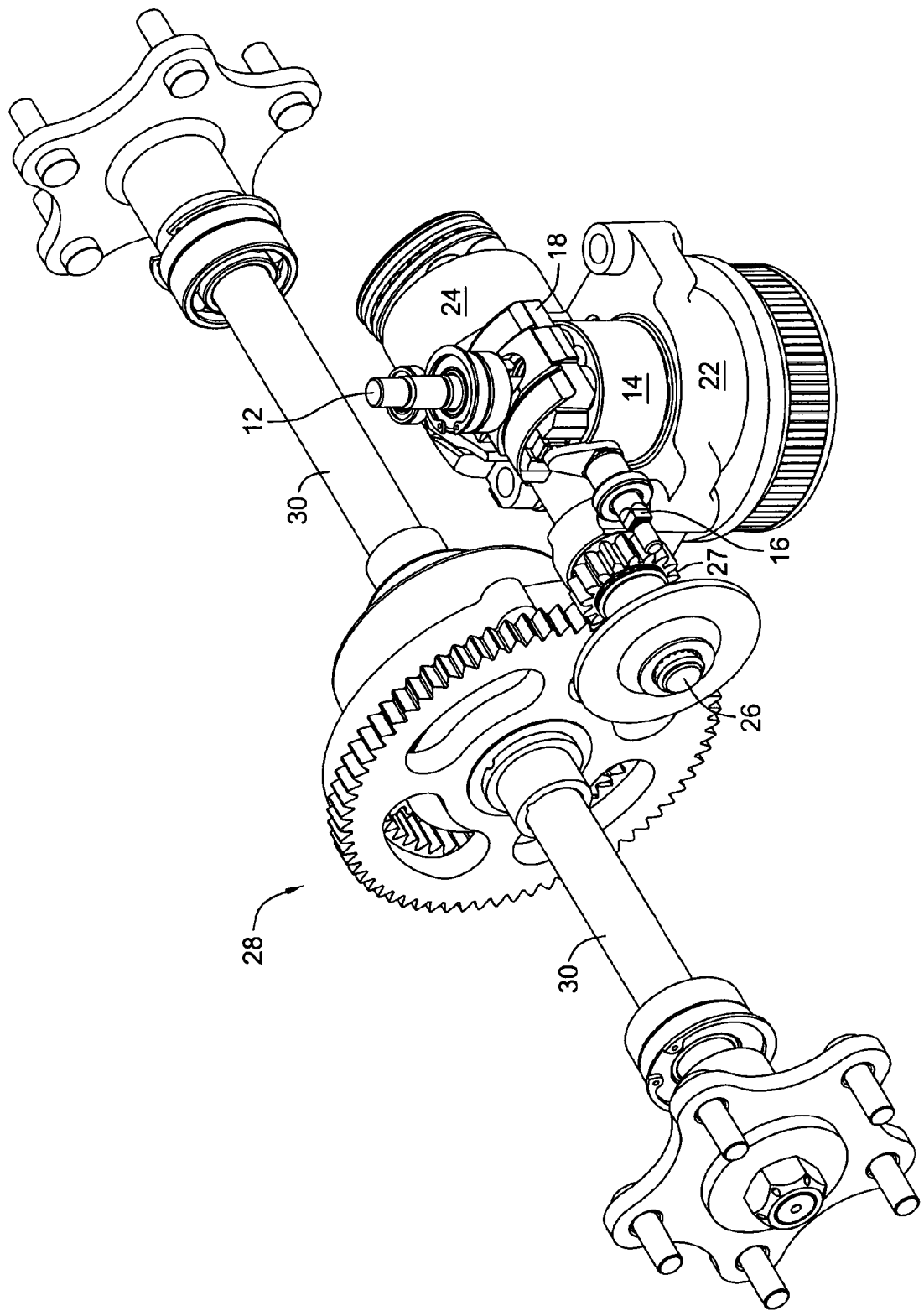
FIG. 3 is a perspective view of certain internal components of the transaxle shown in FIG. 2.
Figure 4:
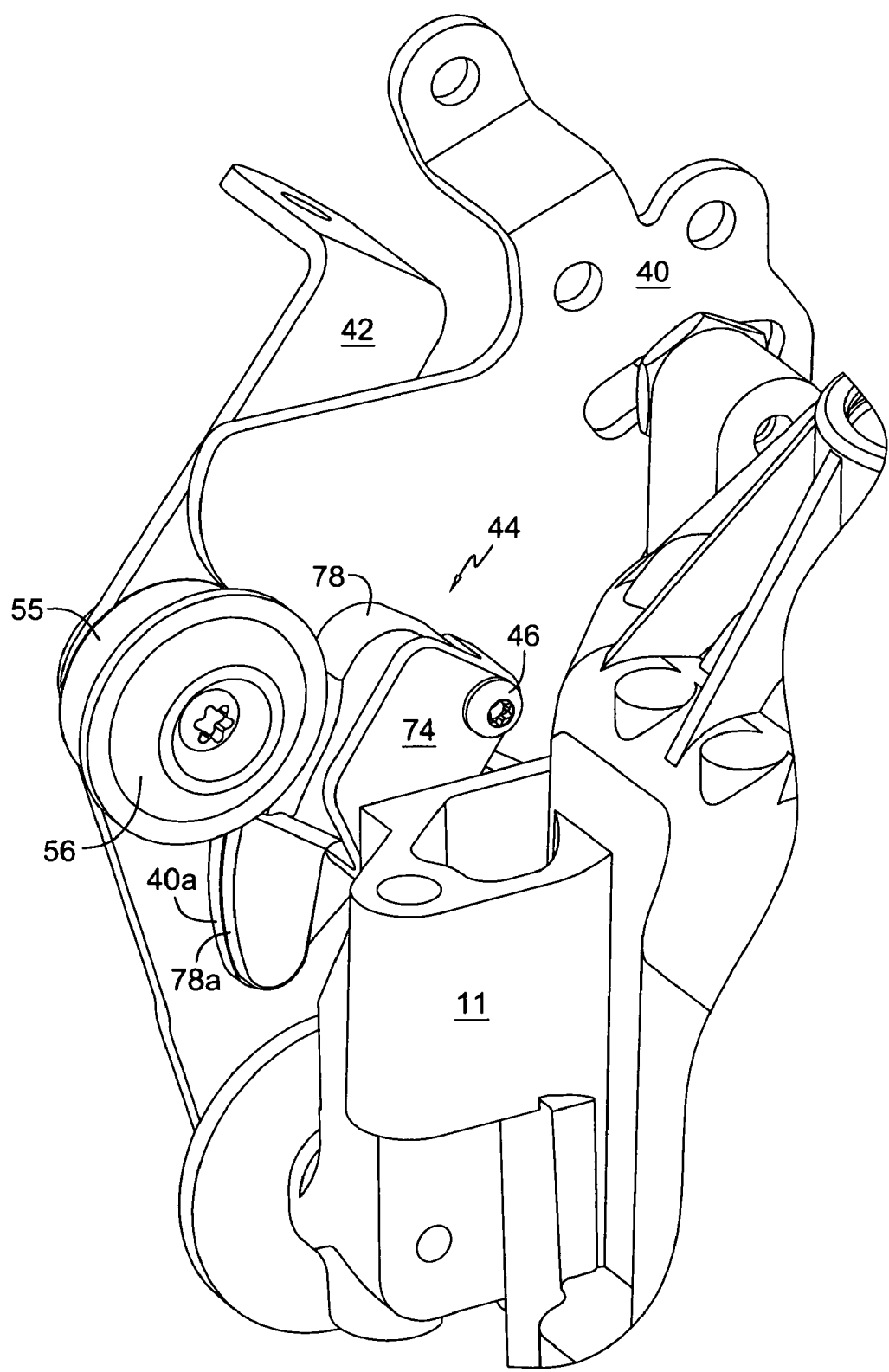
FIG. 4 is a perspective view of certain components of the controls, including part of the transaxle housing, for the transaxle shown in FIG. 2.
Figure 5:
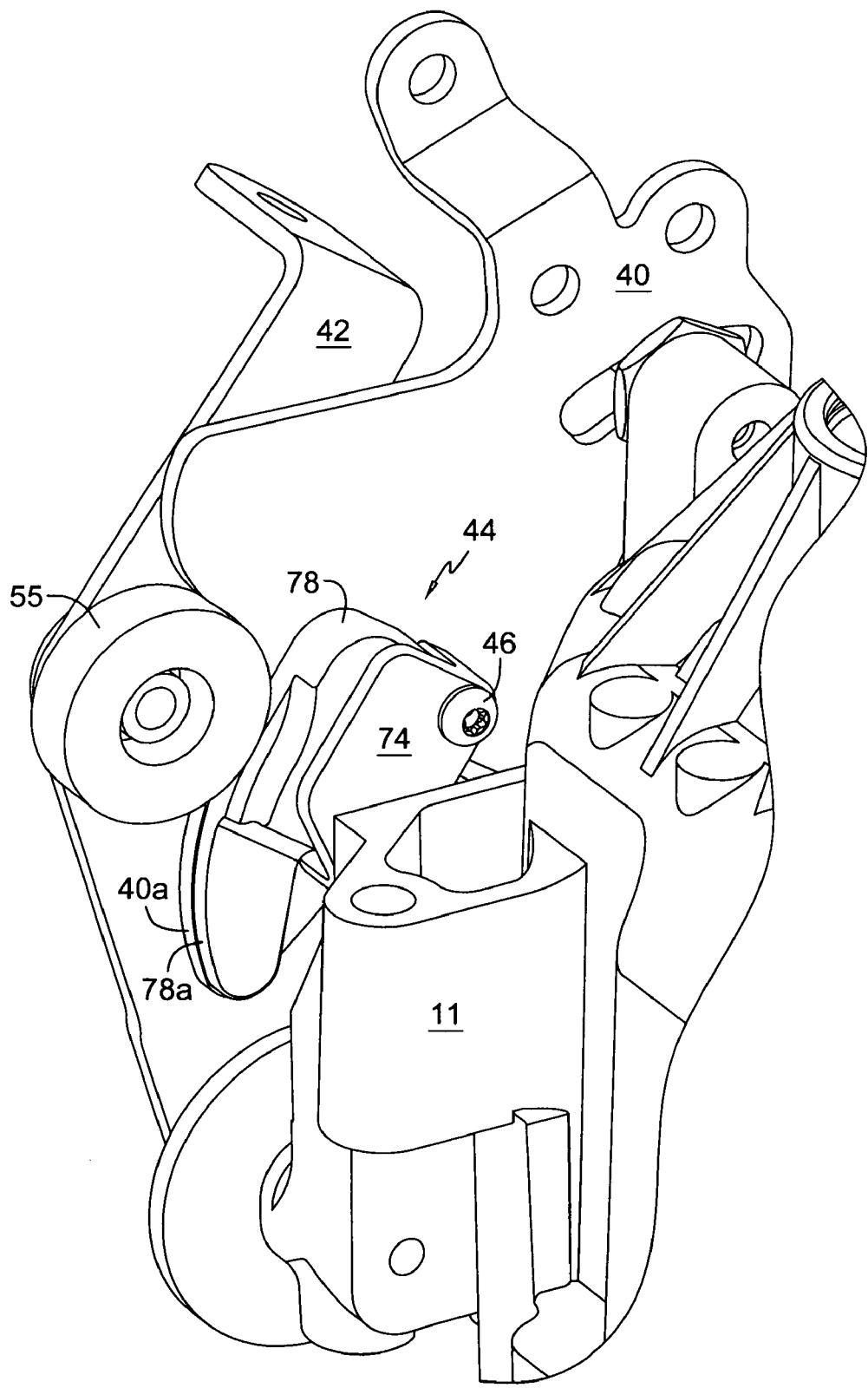
FIG. 5 is a perspective view of the components shown in FIG. 4, with the controls in the neutral position and with the bearing retainer removed.

In the embodiment depicted, for example, in FIGS. 1, 2 and 4, return-to-neutral mechanism 43 may be provided to bias control arm 40 into the neutral position. As shown, return-to-neutral mechanism 43 may comprise bias spring 38 and return arm 42, which cooperates with control arm 40 to urge control arm 40 toward the neutral position, absent input from an operator. In the embodiment depicted, for example, in FIG. 4, return arm 42 engages control arm 40 through bearing 55.

Figure 6:
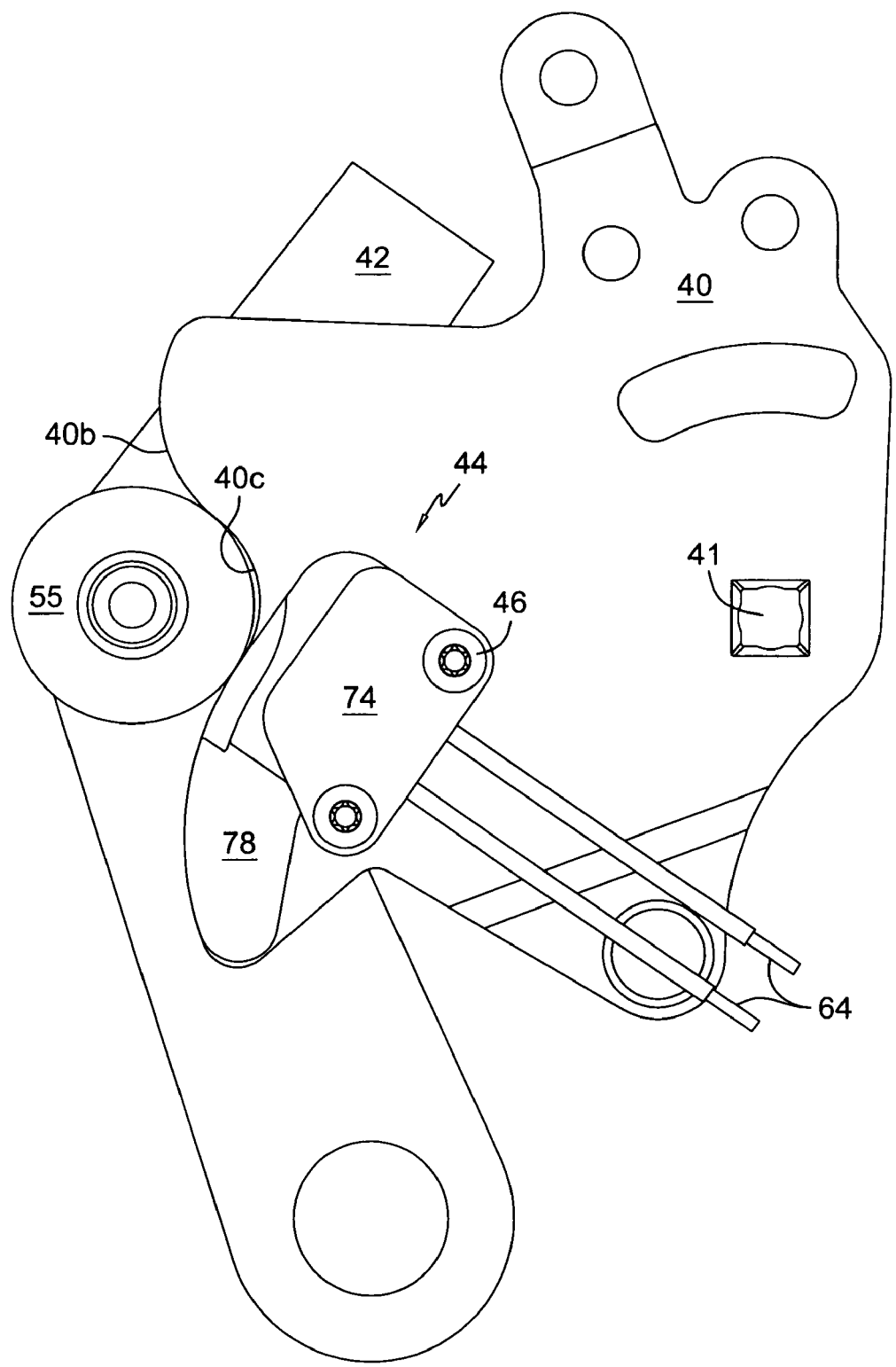
FIG. 6 is a side view of the control arm, return arm and actuator assembly of the transaxle shown in FIG. 2 with the control arm at the neutral position and with the bearing retainer removed.
Figure 8:
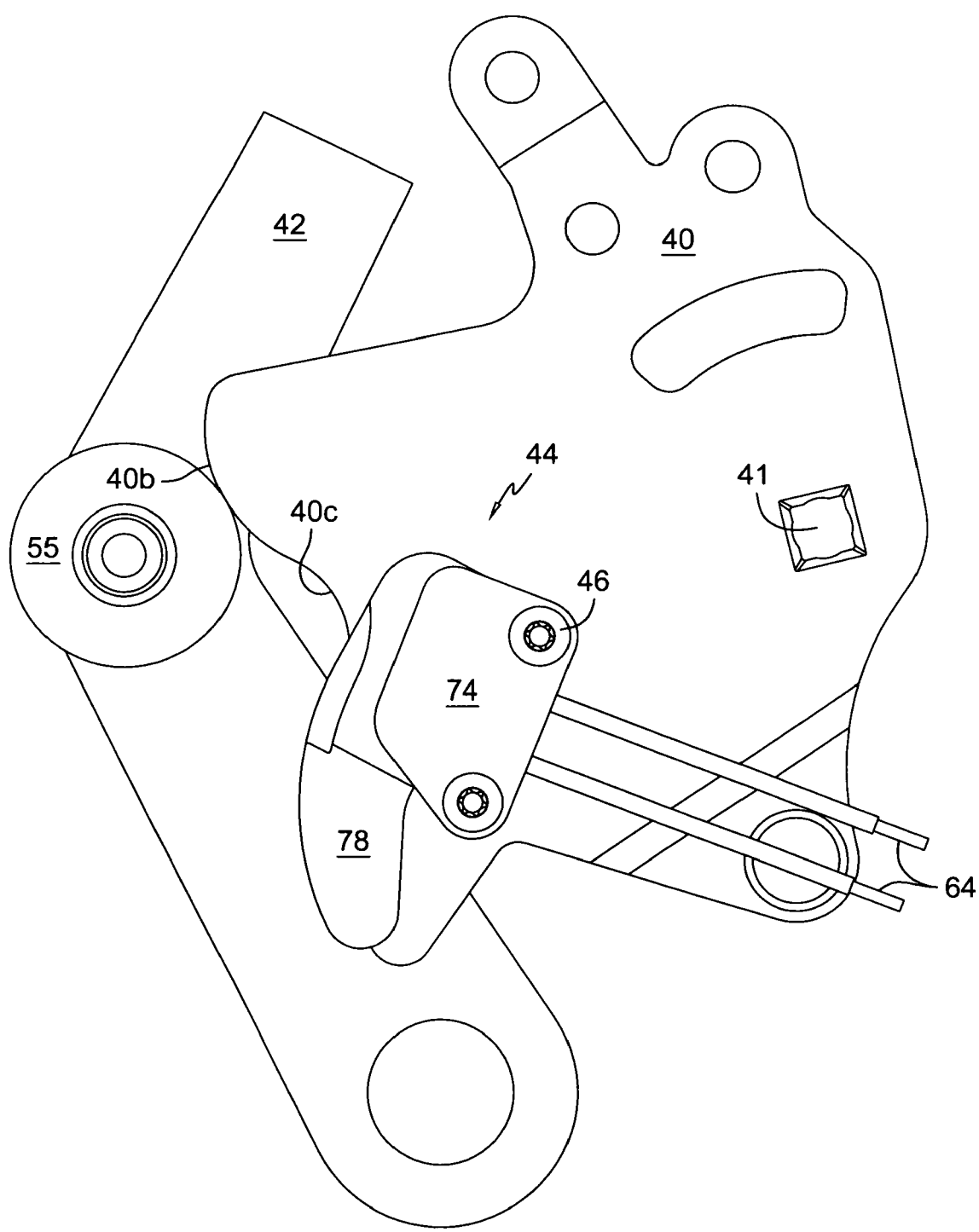
FIG. 8 is a side view similar to that of FIG. 6, with the control arm at a maximum reverse position.
Figure 9:
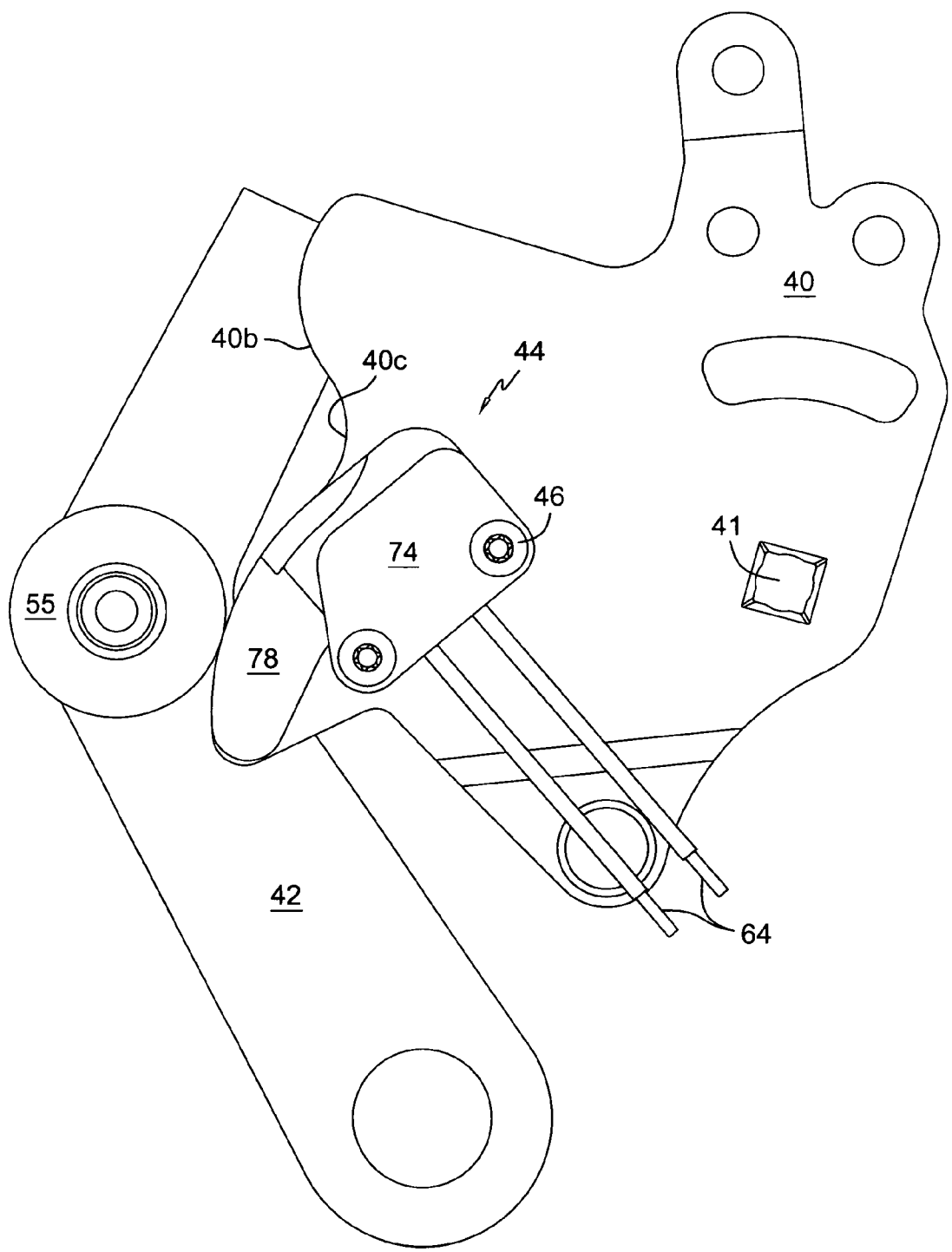
FIG. 9 is a side view similar to that of FIG. 6, with the control arm at a maximum forward position.

Control arm 40 includes formed edge areas 40a, 40b and 40c, which correspond to the plurality of forward and reverse positions and the neutral position of control arm 40, respectively, as discussed in detail below. Bearing retainer 56 is positioned adjacent to bearing 55 and aids in aligning bearing 55 with formed edge areas 40a-40c. In the embodiment depicted in FIGS. 4-6, formed edge areas 40a-40c are shaped such that the force from bias spring 38 maintains bearing 55 on edge area 40c of control arm 40, absent operator input. As an operator rotates control arm 40 through linkage (not shown) connected to pedal 34, to any of the plurality of forward positions, bearing 55 will move along formed edge 40a, as depicted, for example, in FIG. 9. As an operator rotates control arm 40 to any of the plurality of reverse positions, bearing 55 will move along formed edge area 40b, as depicted, for example, in FIG. 8. To achieve forward movement of vehicle 36, control arm 40 is rotated clockwise about opening 41 in FIG. 9. Control arm 40 and return arm 42 may be mounted to transaxle 10 as seen in FIG. 2. Control arm 40 includes an opening 41 through which trunnion arm 16 may be disposed. Return arm 42 is mounted to transaxle 10 by a retainer assembly 33, which permits adjustment of the position of return arm 42 to establish the neutral position.

Figure 10:
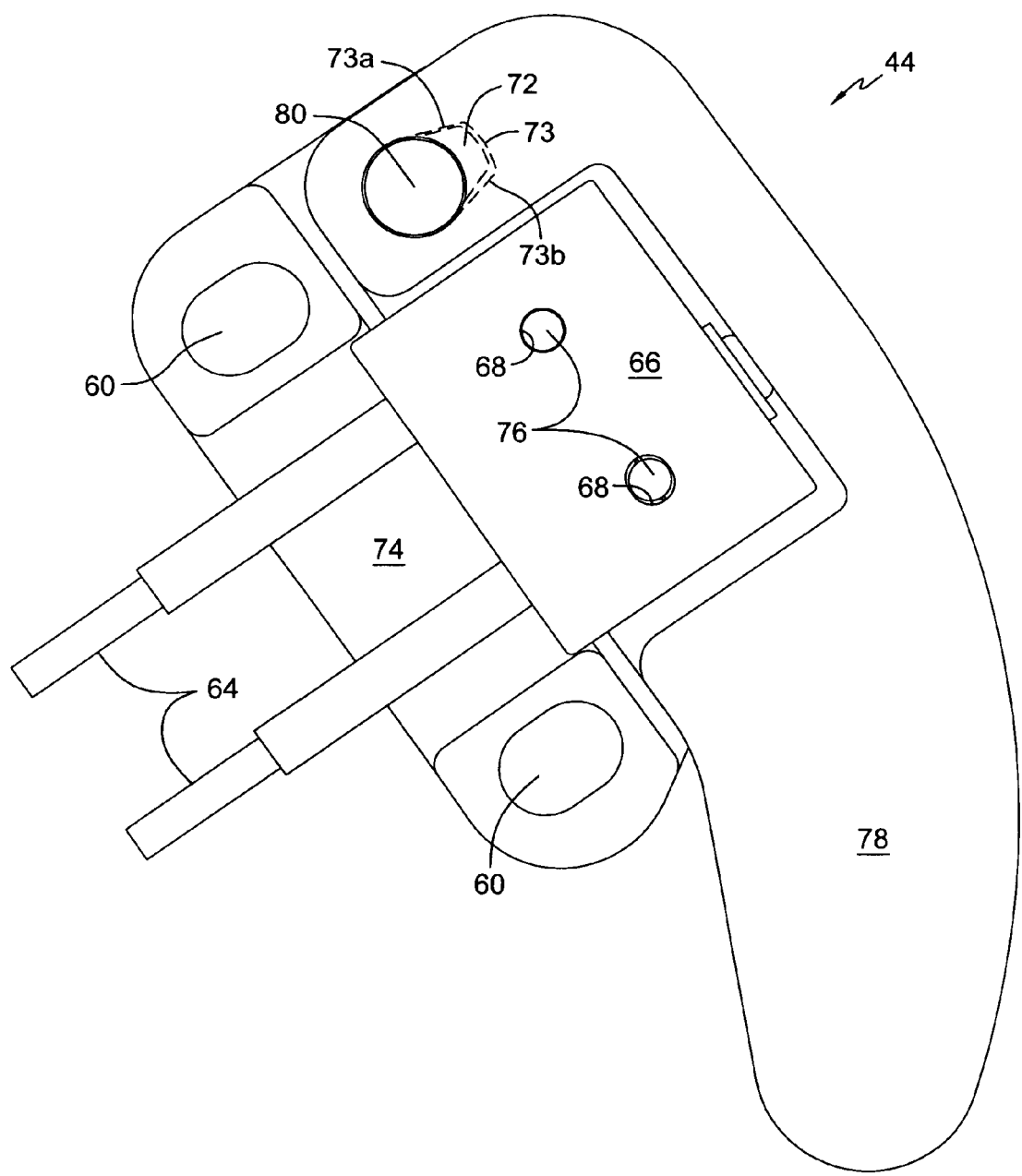
FIG. 10 is a side view of an embodiment of the actuator assembly, with the actuator arm in the first position.
Figure 11:
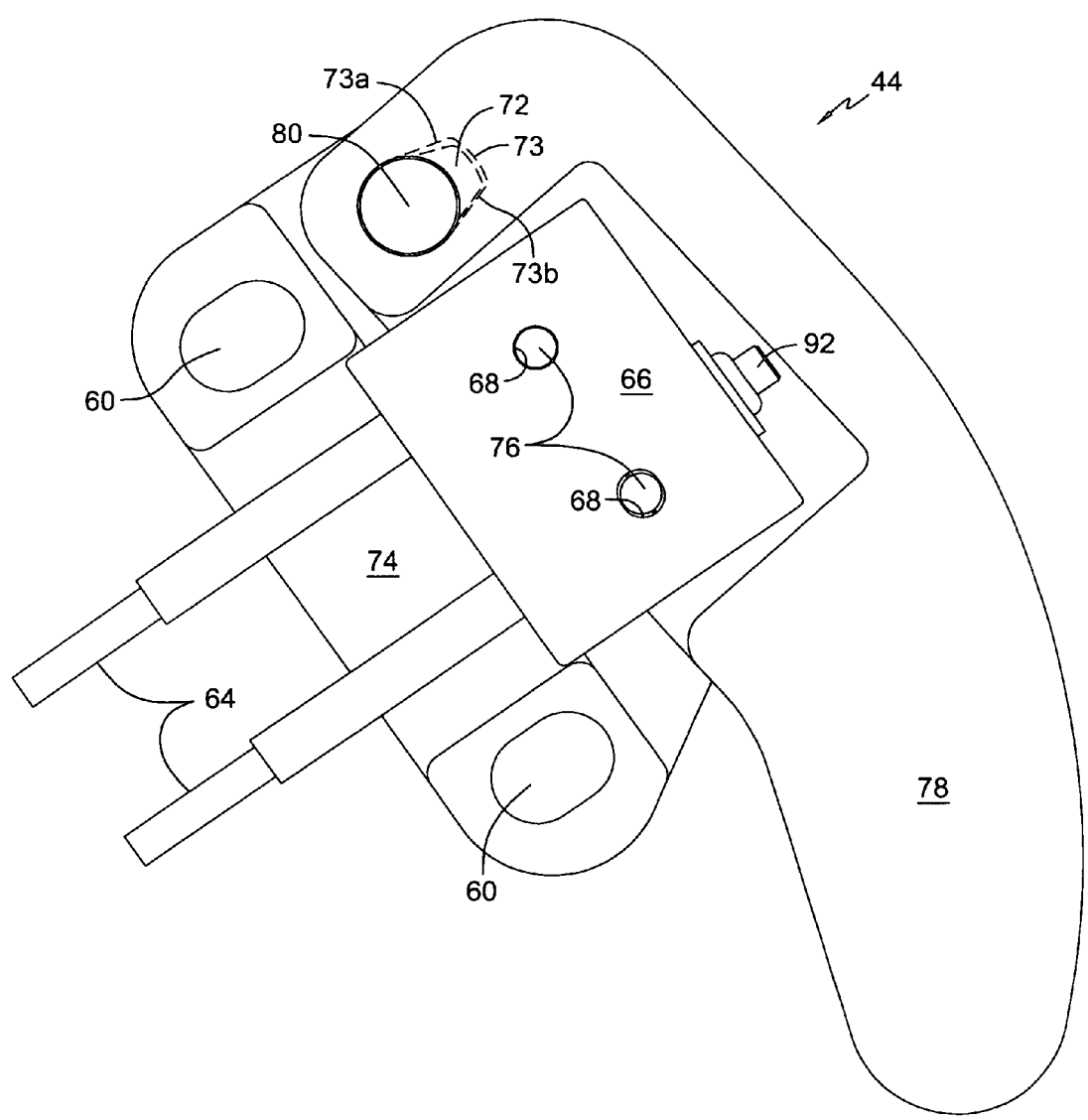
FIG. 11 is a view similar to FIG. 10, with the actuator arm in the second position.
Figure 12:
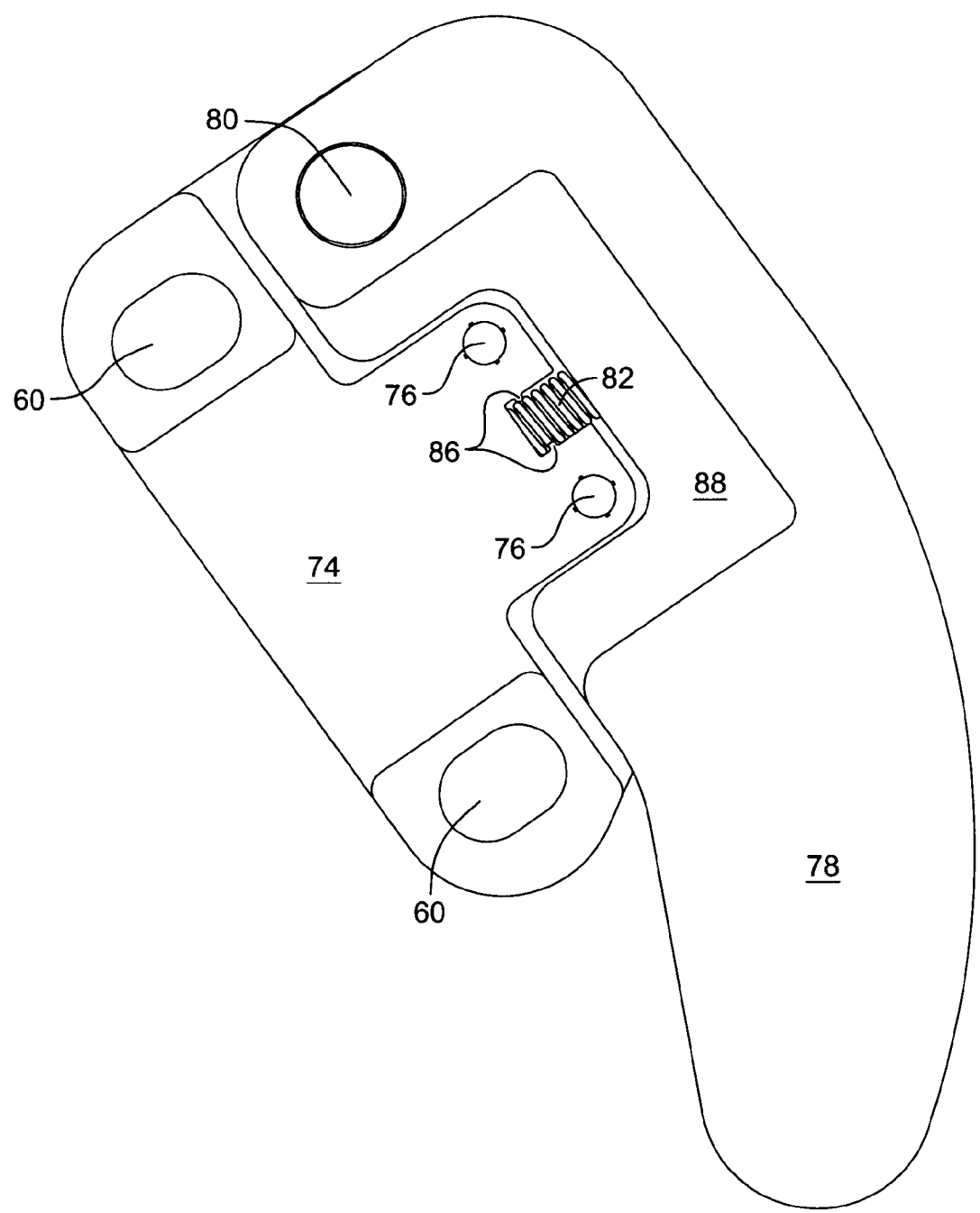
FIG. 12 is a view similar to FIG. 10 with the switch removed from the actuator assembly and the actuator arm in the first position.
Figure 13:
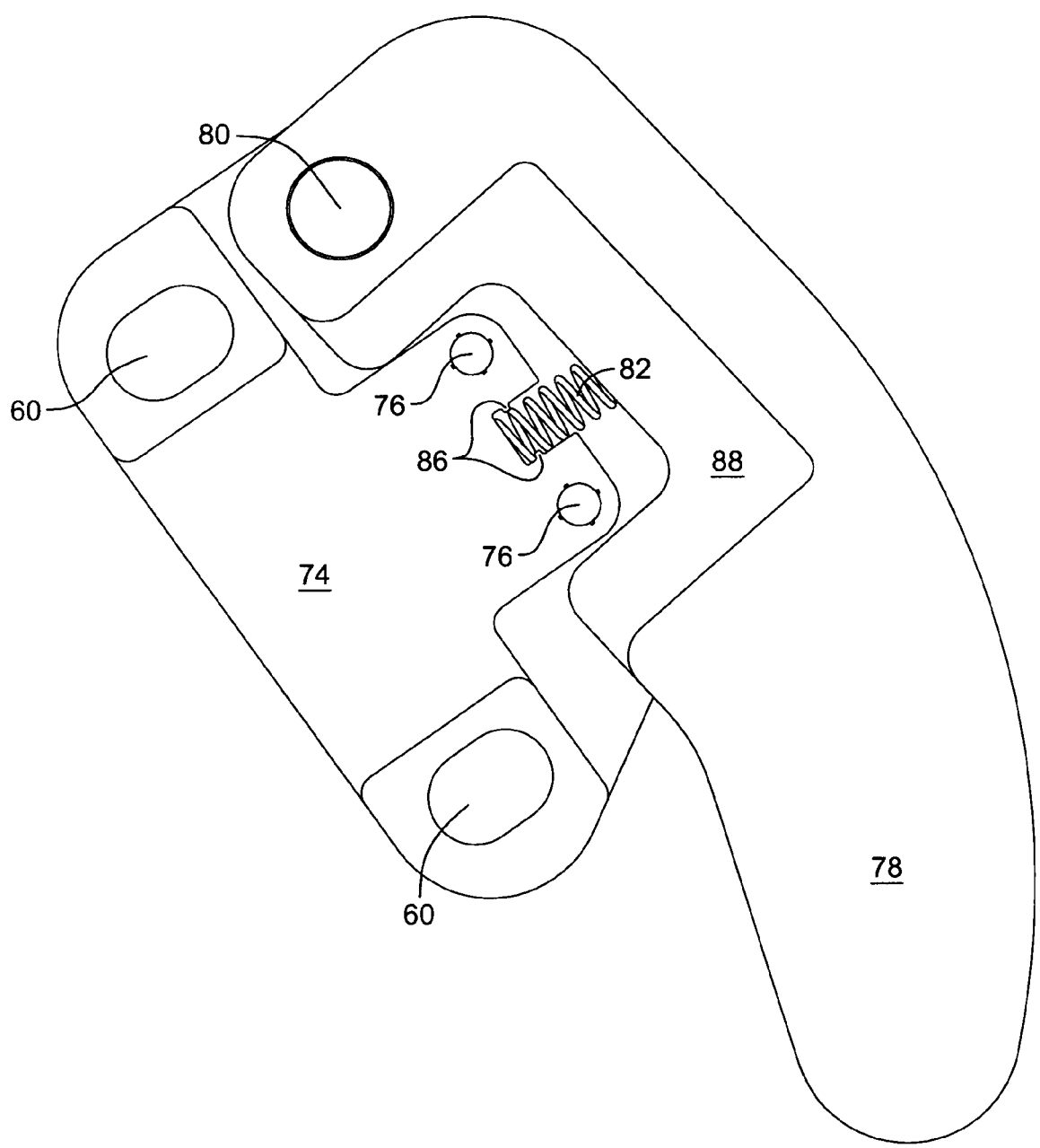
FIG. 13 is a view similar to FIG. 11 with the switch removed from the actuator assembly and the actuator arm in the second position.
Figure 14:
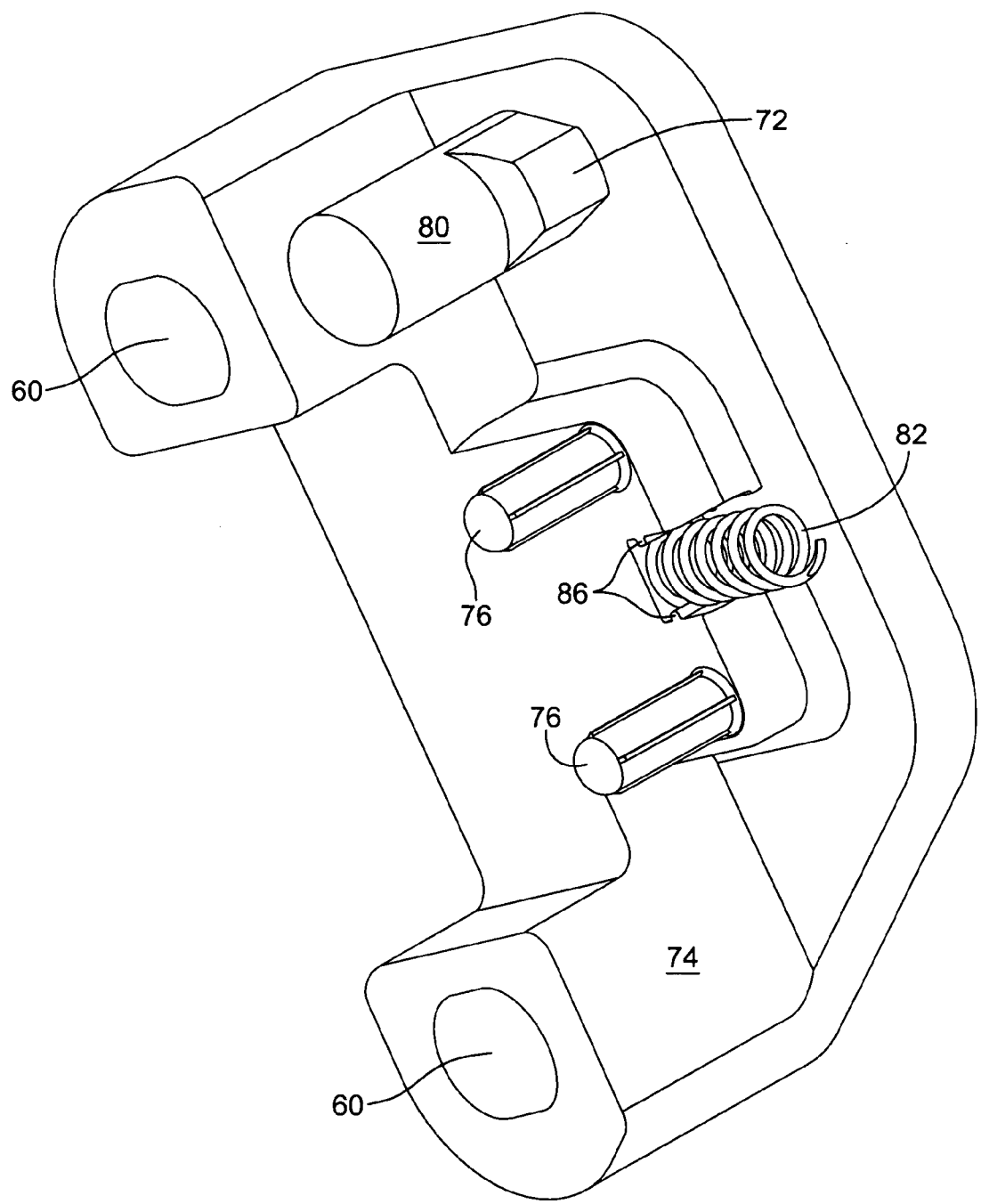
FIG. 14 is a perspective view of the base and spring assembly of an embodiment of the actuator assembly.

Actuator assembly 44 is shown most clearly in FIGS. 10-16 and comprises actuator arm 78 rotatably mounted on pivot 80 of actuator base 74, and rotatable between a first and a second position. Actuator assembly 44 is secured to control arm 40 with fasteners 46. Fasteners 46 extend through openings 60 in actuator base 74 into holes 62 formed in control arm 40. Switch 66 is located on actuator base 74 by protrusions 76, extending through openings 68. Switch 66 has a second state, which corresponds to the normal state of switch 66, and a first state. Switch 66 may be normally closed or normally open. As described in detail below, actuator arm 78 forces switch 66 to the first state when actuator arm 78 is in the first position. Conversely, actuator arm 78 allows switch 66 to maintain its second or normal state when actuator arm 78 is in the second position. With actuator arm 78 positioned on actuator base 74 as shown in FIG. 11, protrusions 76 locate switch 66 so that switch 66 is in proximity to recess 88 formed in actuator arm 78. Actuator bias spring 82 is positioned in recess 84, formed in actuator base 74. The interaction of spring 82 with ridges 86 aids in the retention of spring 82 in recess 84 during assembly.

Figure 15:
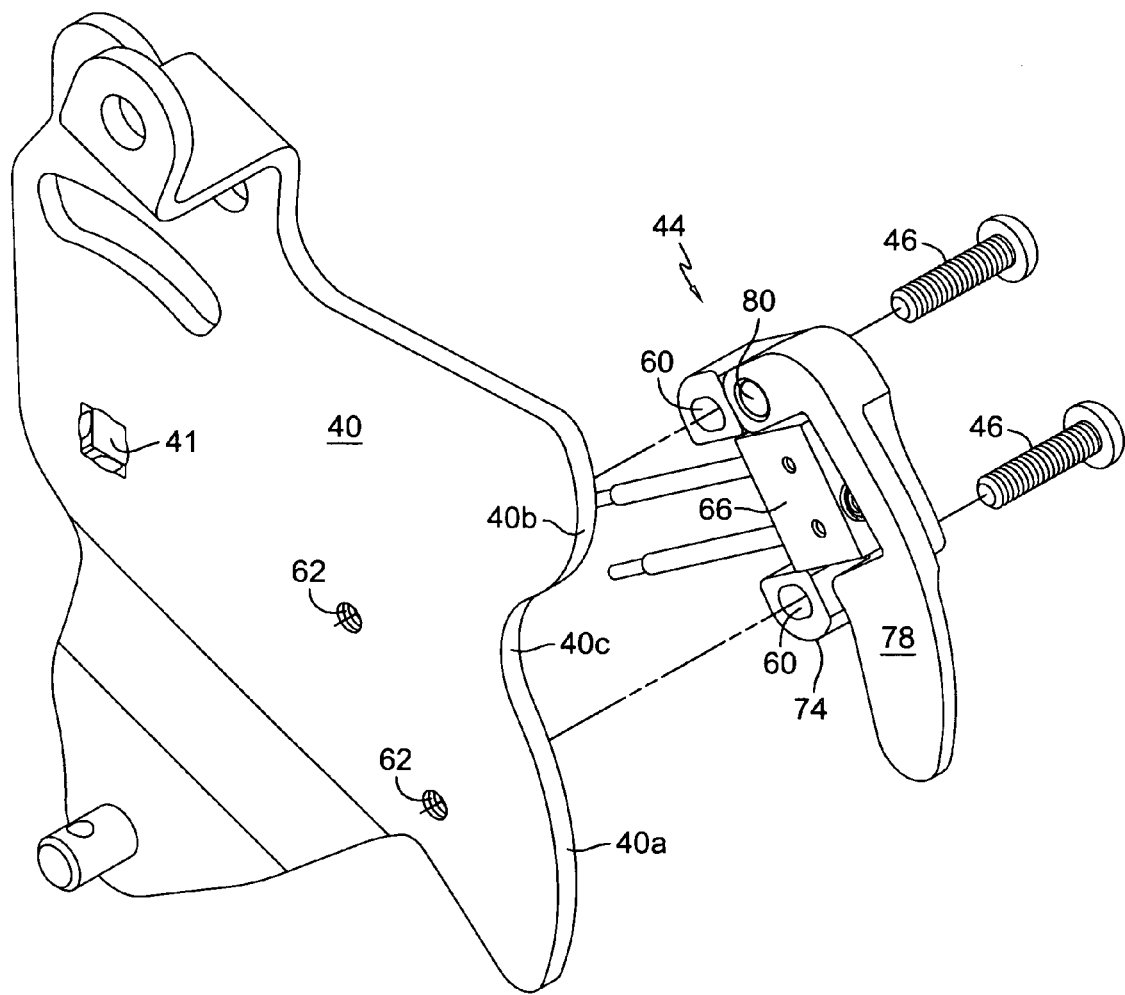
FIG. 15 is a partially exploded view of an embodiment of the control arm and actuator assembly.

In the depicted embodiment, as shown in FIG. 15, actuator base 74 is formed such that, when actuator assembly 44 is attached to control arm 40, a small gap is formed between actuator arm 78 and control arm 40. In this manner, actuator arm 78 may rotate with respect to both actuator base 74 and control arm 40. The attachment of actuator base 74 to control arm 40 further retains switch 66 on actuator base 74 which in turn further retains spring 82 in recess 84.

As previously noted, actuator assembly 44 is mounted to control arm 40 by fasteners 46 extending through openings 60. Openings 60 may be slotted to allow adjustment of actuator assembly 44 such that, when actuator arm 78 is in the first position shown in, for example, FIGS. 4, 5 and 6, edge 78a of actuator arm 78 is in alignment with formed edge area 40a of control arm 40. Furthermore, the contour of actuator arm 78 may be approximately the same as the contour of formed edge area 40a. In the depicted embodiment, edge 78a and formed edge area 40a are curvilinear. It will be appreciated, however, that the scope of the present invention includes an embodiment where edge 78a and formed edge area 40a are linear. Thus, in the depicted embodiment, as control arm 40 is rotated to the neutral position or any of the plurality of forward positions, bearing 55 will remain in contact with both formed edge area 40a of control arm 40, as well as edge 78a of actuator arm 78, maintaining both actuator arm 78 in the first position and switch 66 in the first state.

Proper positioning of actuator assembly 44 on control arm 40 is important; if actuator assembly 44 is positioned too far below the edge of control arm portion 40a, then actuator arm 78 may have insufficient movement to actuate switch 66. If actuator assembly 44 is positioned too near the edge of control arm portion 40a then the contact between bearing 55 and actuator arm 78 may cause damage to actuator arm 78 and possibly to other elements of actuator assembly 44. Slotted openings 60 permit adjusting the position of actuator assembly 44 prior to securing fasteners 46.

Figure 7:
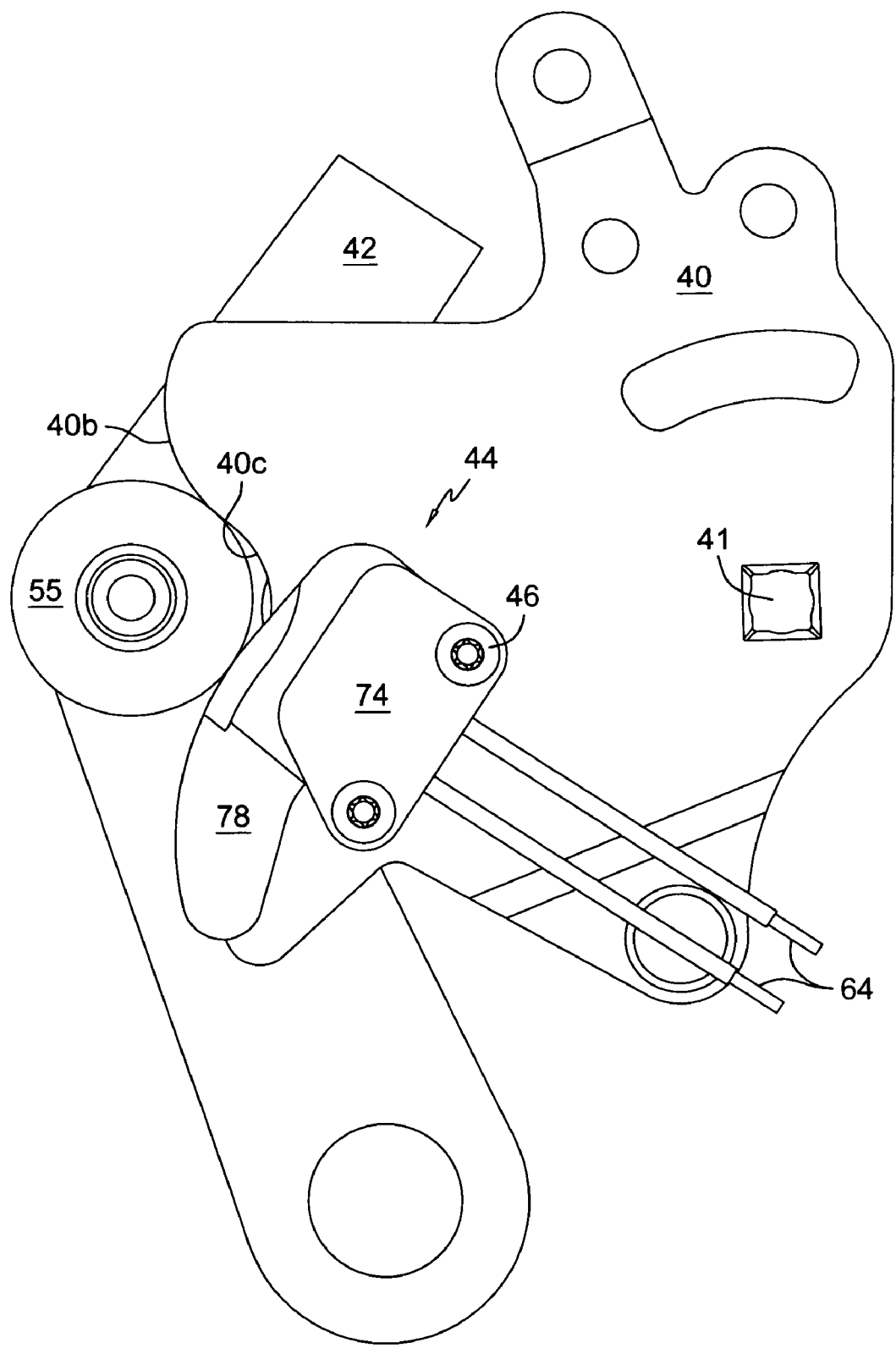
FIG. 7 is a side view similar to that of FIG. 6, with the control arm at a reverse position.
Figure 16:
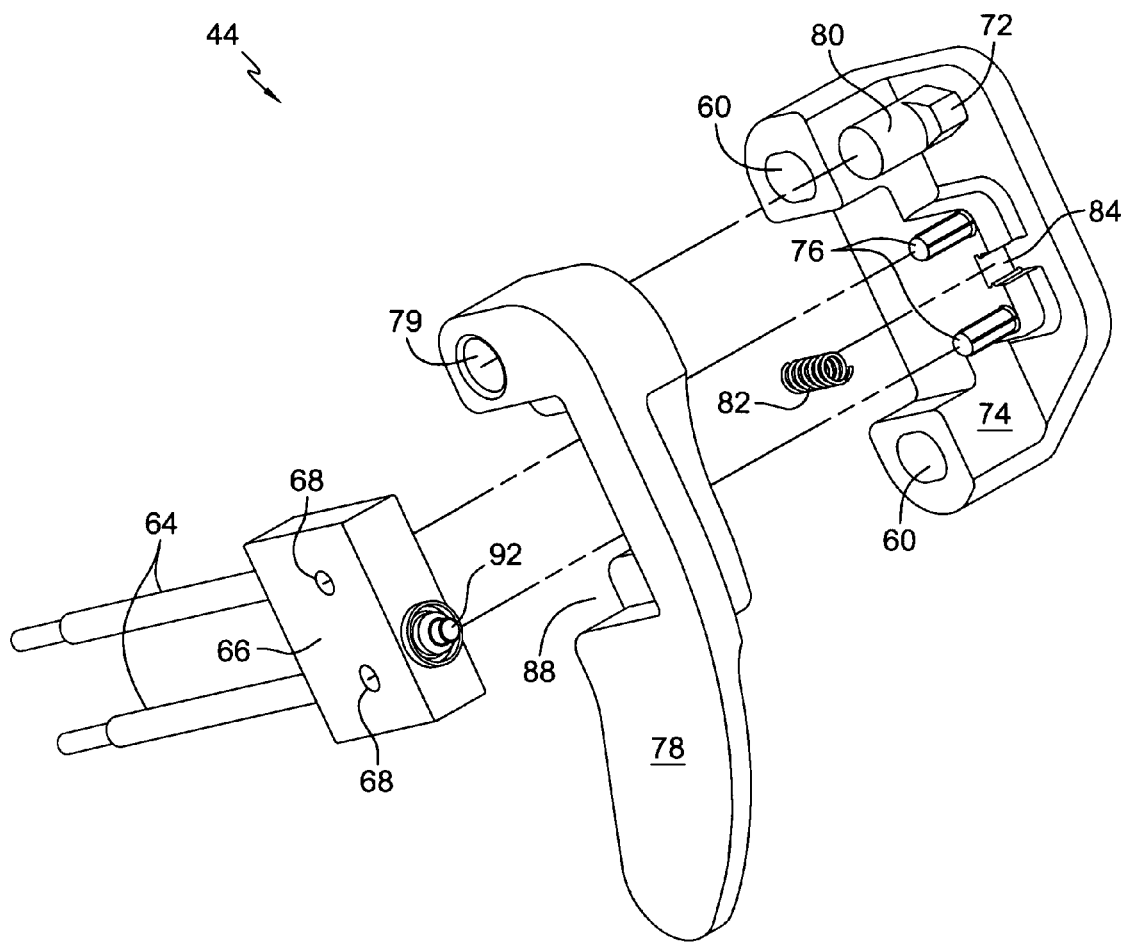
FIG. 16 is an exploded view of an embodiment of the actuator assembly.

As seen more clearly in FIGS. 16 and 10-11, stop 72 may be formed on pivot 80 and cooperate with recess 73, formed adjacent to opening 79 in actuator arm 78, to restrict the movement of actuator arm 78. As actuator arm 78 rotates to the first position, as seen, for example, in FIGS. 4, 6, 9, and 10, stop 72 may contact wall 73a of recess 73, to provide one limit of movement of actuator arm 78. As actuator arm 78 rotates to the second position, as seen, for example, in FIGS. 7, 8 and 11, stop 72 will contact wall 73b of recess 73 to provide another limit of movement of actuator arm 78.

In the depicted embodiment, the above-defined components operate as follows. Return-to-neutral mechanism 43 initially biases control arm 40 to the neutral position, where bearing 55 is in contact with formed edge area 40c of control arm 40 and edge 78a of actuator arm 78. By engaging actuator arm 78, bearing 55 urges actuator arm 78 into the first position, thus causing switch 66 to enter its first state. It will be appreciated by those in the art that the scope of the present invention includes bearing 55 being disengaged from actuator arm 78 when control arm 40 is in the neutral position.

As an operator moves a vehicle control such as, for example, pedal 34, to any of the forward positions, the linkage from the vehicle control causes a proportional movement of control arm 40. Movement of control arm 40 to any of the forward positions causes bearing 55 to travel along formed edge area 40a of control arm 40, as well as along edge 78a of actuator arm 78, continuing to maintain actuator arm 78 in the first position. If bearing 55 is disengaged from actuator arm 78 when control arm 40 is in the neutral position, movement of control arm 40 to any of the forward positions will cause bearing 55 to engage actuator arm 78. When actuator arm 78 is rotated to the first position, it depresses plunger 92, as seen, for example, in FIG. 10, causing switch 66 to enter the first state.

As an operator moves a vehicle control, such as pedal 34, to any of the reverse positions, the vehicle control linkage causes a proportional movement of control arm 40 and bearing 55 travels along formed edge area 40b of control arm 40. This movement is depicted most clearly in FIGS. 7 and 8. As control arm 40 is moved to any of the reverse positions, bearing 55 disengages from edge 78a of actuator arm 78 allowing spring 82 and any bias spring (not shown) internal to switch 66, to force actuator arm 78 to the second position. As actuator arm 78 moves to the second position, plunger 92 is no longer depressed, and switch 66 maintains the second state. The exact angle at which bearing 55 disengages from edge 78a will depend on a number of variables. In the example shown in this embodiment, the angle of control arm 40 is approximately 1.5° from neutral when bearing 55 disengages from edge 78a.

The depicted embodiment allows for a number of variations depending on the needs of the user. In one embodiment, the second state of switch 66 may correspond to a closed state, which would provide a connection to an operating system. By way of example, and in no way limiting, if leads 64 are connected to an engine circuit (not shown) on one side and ground on the other side, allowing switch 66 to enter its second state will cause engine 29 to be grounded, thus stopping operation of engine 29.

In another embodiment, switch 66 may be used with a power take off (not shown) to control the function of mower deck 20. With this type of configuration, operation in neutral or in the forward direction would cause switch 66 to be closed, permitting operation of the electric power take off, which would thus allow mower deck 20 to operate. Conversely, operation in the reverse direction would cause switch 66 to be open, removing electrical power from the power take off, thus causing mower deck 20 to cease operation.

In yet another embodiment, the second state of switch 66 may correspond to a closed state, which would provide power to an operating system. As an example, without limitation, switch 66 may be used in conjunction with an electric alarm (not shown). In this type of configuration, movement of control arm 40 to the neutral position or any of the forward positions would cause switch 66 to be in the open state, removing power from the alarm. Conversely, movement of control arm 40 to any of the reverse directions would cause switch 66 to be in its normal or closed condition, supplying electrical power to the alarm, causing the alarm to operate.

An alternative embodiment of the present invention is depicted in FIGS. 17-21. In this configuration, transaxle 110 is similar to transaxle 10 described above. For simplicity, some elements of transaxle 110 have been removed in FIG. 17.

Figure 17:
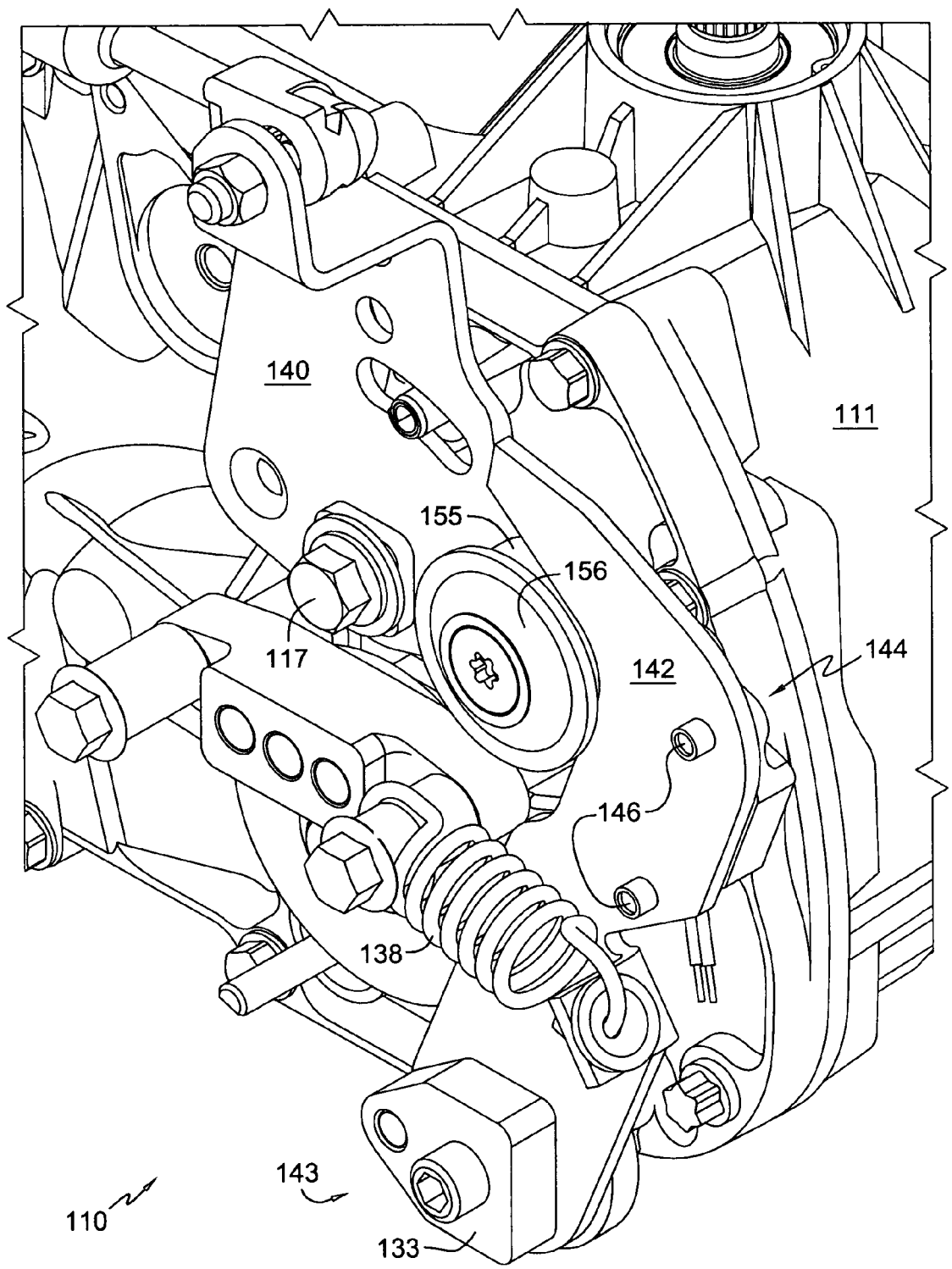
FIG. 17 is a perspective view of a selected portion of the transaxle used in an alternative embodiment.
Figure 18:
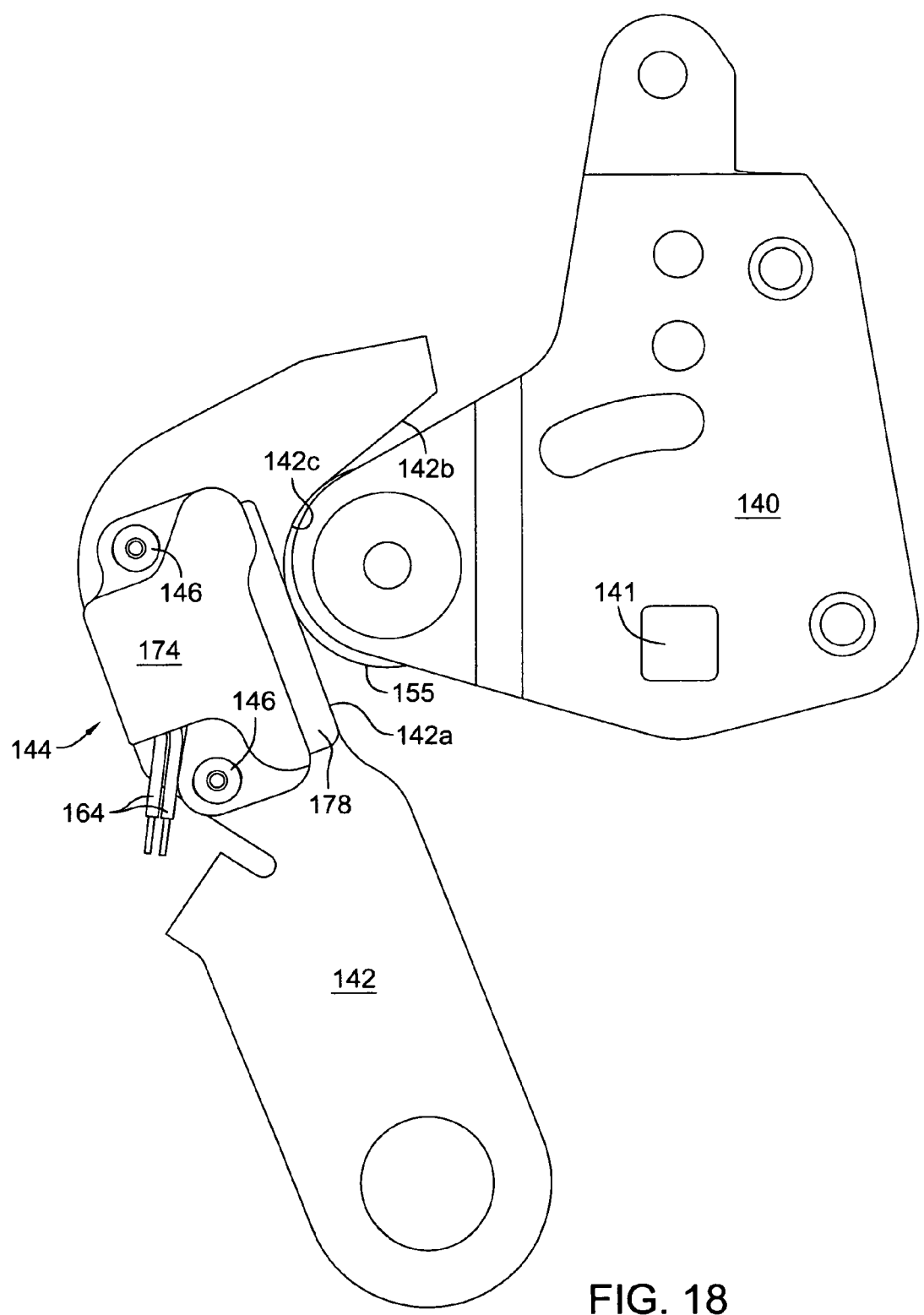
FIG. 18 is a side view of the control arm, return arm and actuator assembly of the transaxle shown in FIG. 17 at the neutral position.
Figure 19:
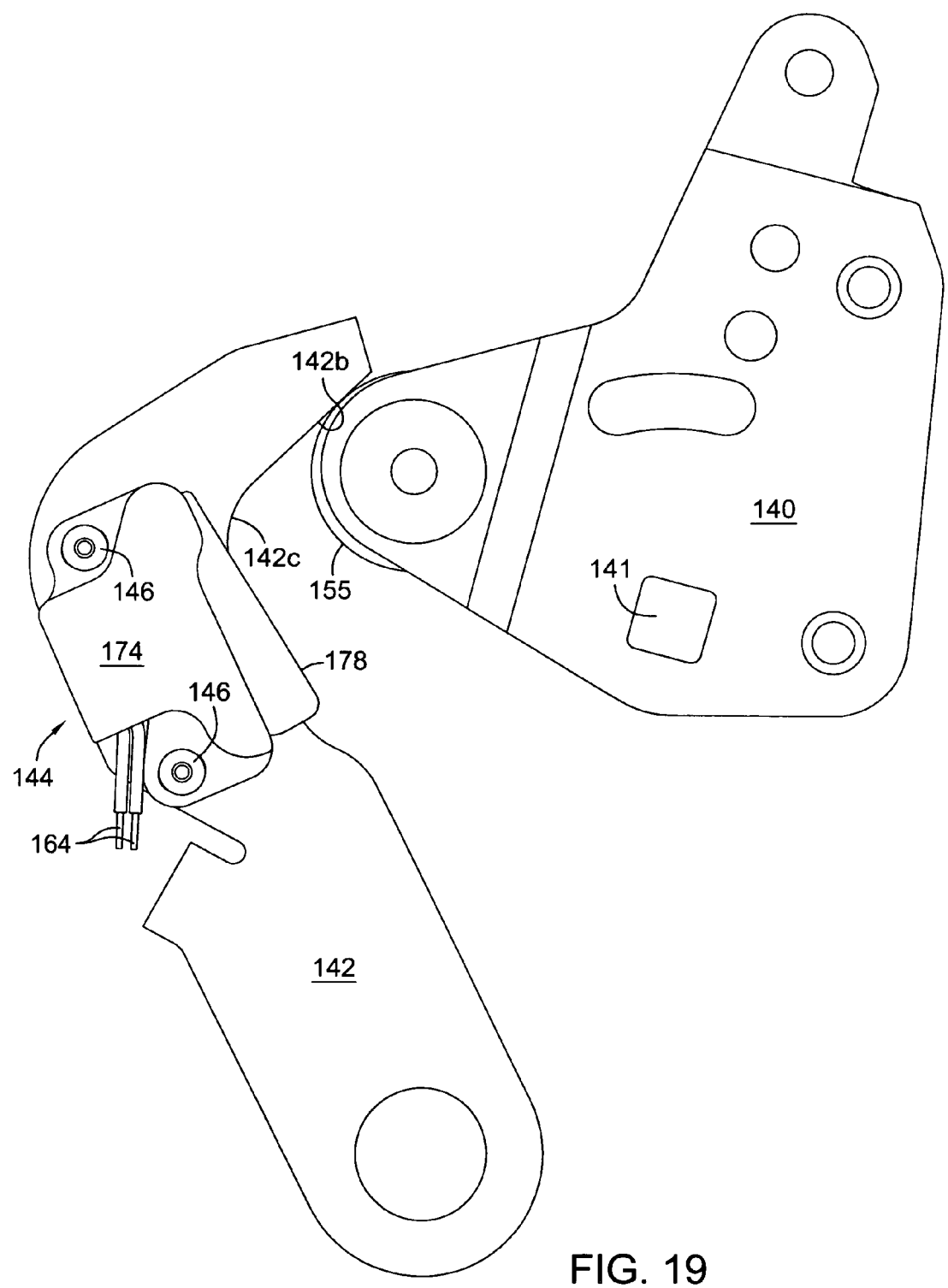
FIG. 19 is a side view of the control arm, return arm and actuator assembly of the transaxle shown in FIG. 17 with the control arm at the maximum reverse position.
Figure 20:
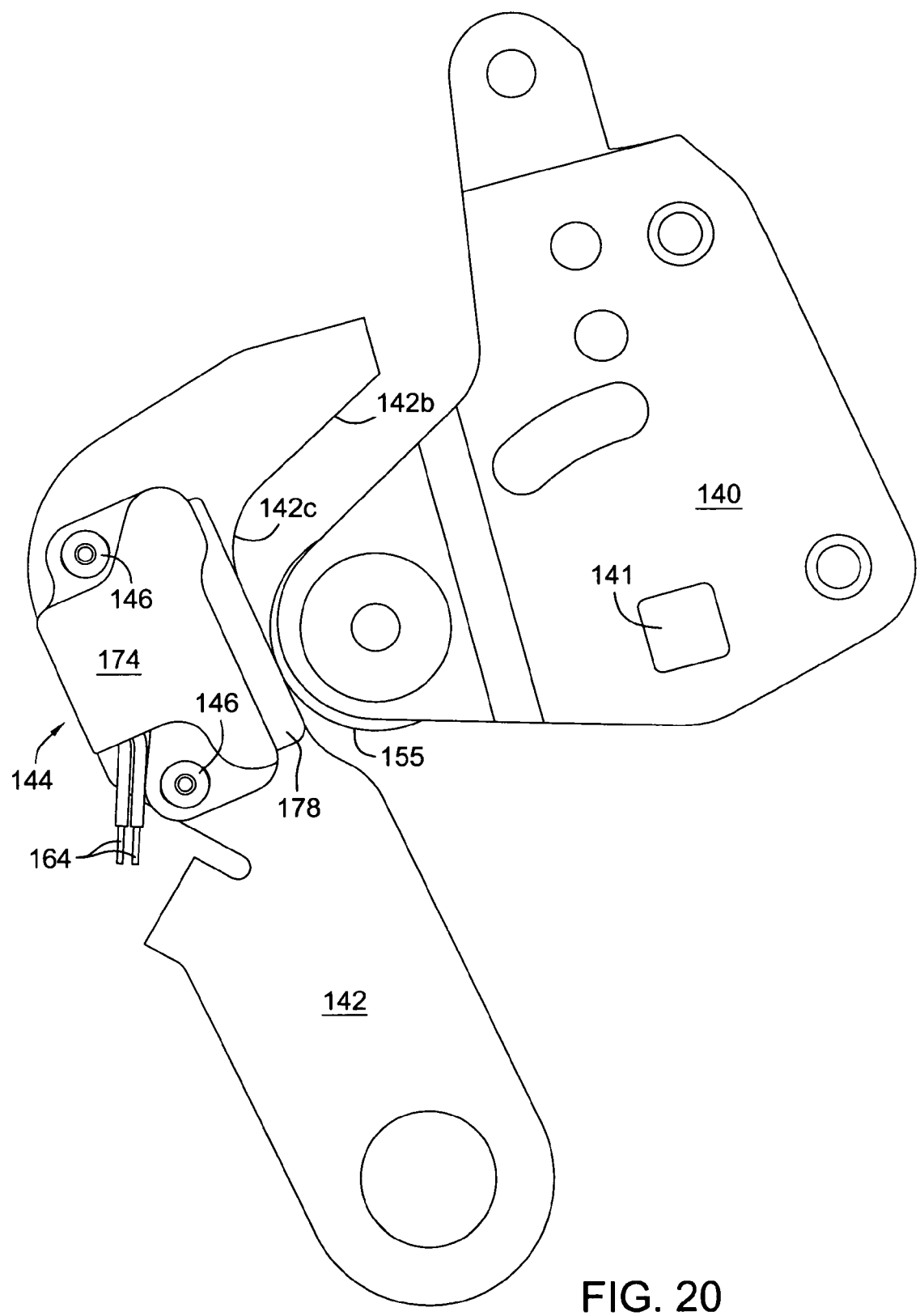
FIG. 20 is a side view of the control arm, return arm and actuator assembly of the transaxle shown in FIG. 17 at a forward position.

The embodiment depicted in FIG. 17 comprises transaxle housing 111, control arm 140, return arm 142, retainer assembly 133, bias spring 138, fastener 117 that attaches control arm 140 to a trunnion (not shown), and bearing 155 with bearing retainer 156. Return arm 142 is mounted to transaxle 110 by a retainer assembly 133, which permits adjustment of return arm 142 to establish a neutral position for control arm 140.

As described above, control arm 140 has a neutral position, a plurality of forward positions and a plurality of reverse positions. In the depicted embodiment, control arm 140 is biased in the neutral position by return-to-neutral mechanism 143, which includes bias spring 138, return arm 142 and retainer assembly 133. Bearing 155 is mounted on control arm 140 and interacts with formed edge areas 142a-c of return arm 142. When in the neutral position, bearing 155 is biased to the area of formed edge area 142c in the absence of operator input. As an operator rotates control arm 140 to any of the forward positions, bearing 155 will move along formed edge area 142a. As an operator rotates control arm 140 to any of the reverse directions, bearing 155 will move along formed edge area 142b. The movement of bearing 155 along formed edge areas 142a-c is shown in, for example, FIGS. 20, 19 and 18, respectively.

Figure 21:
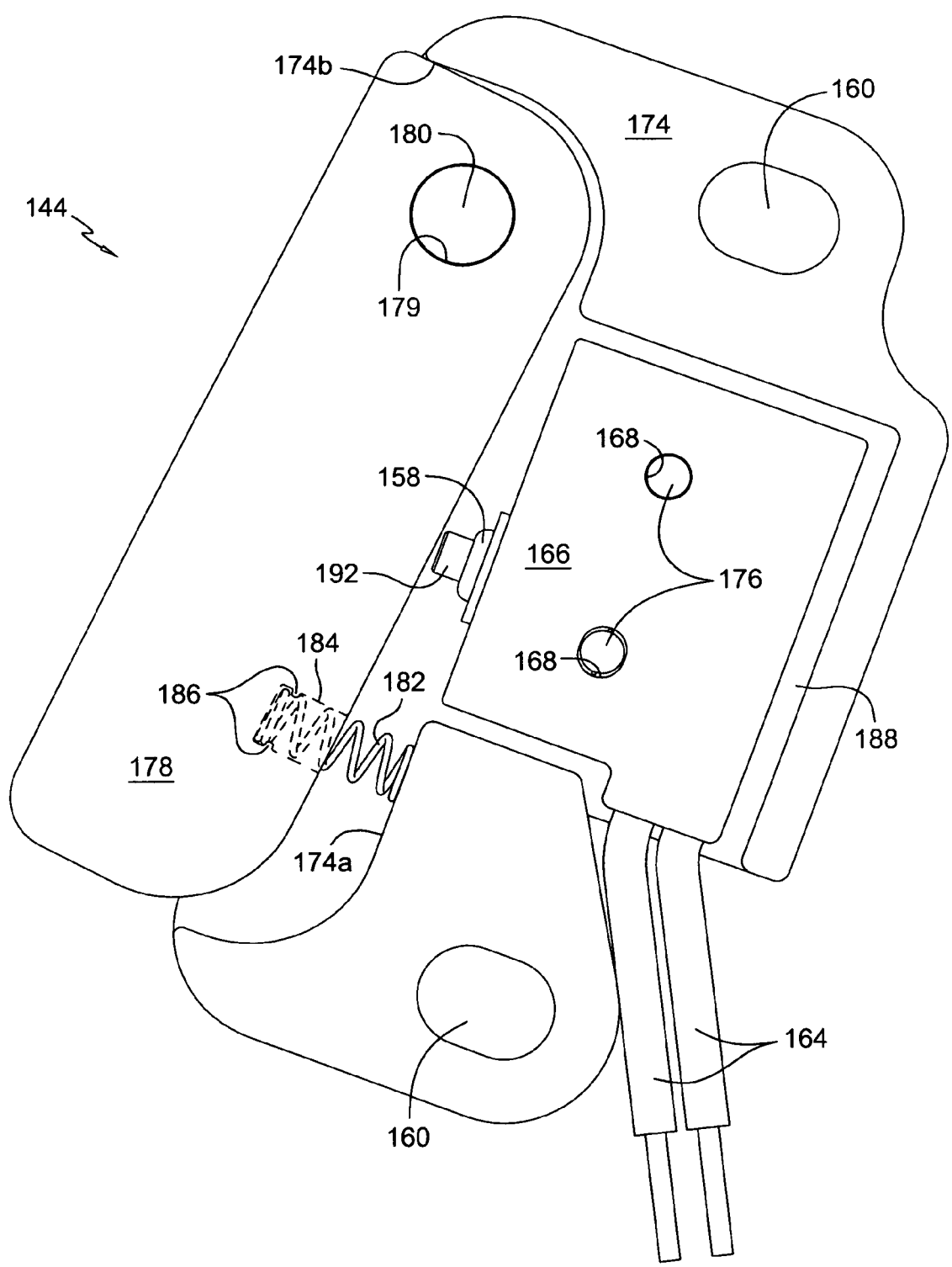
FIG. 21 is a view of the actuator assembly shown in FIGS. 18-20 in the second position.

As depicted in FIGS. 17-21, actuator assembly 144 comprises actuator arm 178, actuator base 174 and switch 166. Actuator assembly 144 may be secured to return arm 142 with fasteners 146, which extend through openings 160 in actuator base 174, into holes (not shown) formed in return arm 142. Actuator arm 178 is rotatably located on actuator base 174 by pivot 180, as seen in FIG. 21, and may be rotated between a first and a second position. Protrusions 176 extend through openings 168 in switch 166 and act to position switch 166 within recess 188, formed in actuator base 174. Spring 182 is positioned in recess 184 which is formed in actuator arm 178. Spring 182 interacts with ridges 186 to aid the retention of spring 182 in recess 184 during assembly.

As previously described, openings 160 may be slotted to allow adjustment of the actuator assembly 144 position, and particularly of actuator arm 178, aiding in the alignment with formed edge area 142a. In the embodiment depicted, for example, in FIG. 18, the contour of actuator arm 178 may be approximately the same as the contour of formed edge area 142a. In this manner, bearing 155 will remain in contact with actuator arm 178 when control arm 140 is in the neutral position or any of the forward positions. It will be understood that the scope of the present invention includes an embodiment wherein bearing 155 will remain in contact with actuator arm 178 when control arm 140 is in any of the forward positions, and will disengage from actuator arm 178 when control arm 140 is in the neutral position, or is rotated to any of the reverse positions.

The embodiment depicted, for example, in FIGS. 17-21, also includes features that limit the range of movement of actuator arm 178. As actuator arm 178 is rotated toward the second position, portion 174b of actuator base 174 acts as a stop against actuator arm 178 by contacting actuator arm 178 and limiting the movement of actuator arm away from plunger 192 to the position shown in FIGS. 19 and 21. As actuator arm 178 is rotated toward the first position, actuator base portion 174a limits the movement of actuator arm 178 to the position shown in FIGS. 18 and 20. Portion 174a is enabled as a stop due to plunger boot 158 compressing into switch 166 when actuator arm 178 depresses plunger 192. Further, spring 182 compresses entirely into recess 184 when actuator arm 178 rotates toward switch 166. The spring 182 compression into recess 184 allows actuator assembly 144 to be more compact.

It is to be understood that the above description of the invention should not be used to limit the invention, as other embodiments and uses of the various features of this invention will be obvious to one skilled in the art. This invention should be read as limited by the scope of its claims only.

We claim:

1. A hydraulic drive apparatus mounted on a vehicle comprising an operating system having a first and a second operating state, the hydraulic drive apparatus comprising:
    a housing;
    a hydraulic pump located within the housing;
    a control device, at least a portion of which is coupled to the hydraulic pump to control the hydraulic pump fluid flow, the control device movable among a neutral position, a plurality of reverse positions and a plurality of forward positions, the control device comprising:
        a first control device component; and
        a second control device component; and
    an actuator assembly mounted to the first control device component and selectively engaged to the second control device component, the actuator assembly connected to the operating system, wherein the actuator assembly causes the operating system to be in the first operating state when the control device is in the neutral position or is rotated to any of the forward positions and the actuator assembly causes the operating system to be in the second operating state when the control device is in any of the reverse positions.

2. The hydraulic drive apparatus of claim 1, further comprising a bearing mounted on the second control device component and engaged to the first control device component, the bearing moveable along a first, a second and a third edge portion, each edge portion formed on the first control device component, wherein and the second control device component is rotatable with respect to the first control device component.

3. The hydraulic drive apparatus of claim 2, wherein the actuator assembly comprises:
    an actuator base mounted on the first control device component;
    a switch having a first and a second state, which correspond to the first and second state of the operating system, respectively, wherein the switch is disposed on the actuator base and connected to the operating system; and
    an actuator arm moveably engaged to the actuator base and alternately engaged to the bearing, the actuator arm moveable between a second position, which allows the switch to maintain the second state, and a first position, which causes the switch to enter the first state, wherein engagement with the bearing forces the actuator arm into the first position.

4. The hydraulic drive apparatus of claim 3, wherein the bearing is engaged to the first edge portion of the first control device component and to the actuator arm when the control device is in the neutral position.

5. The hydraulic drive apparatus of claim 3, wherein rotation of the control device to any of the forward positions causes the bearing to move along the second edge portion of the first control device component and to move along the actuator arm.

6. The hydraulic drive apparatus of claim 3, wherein rotation of the control device to any of the reverse positions causes the bearing to move along the third edge portion of the first control device component and disengage the actuator arm.

7. The hydraulic drive apparatus of claim 1, wherein the first control device component is a control arm, engaged to the hydraulic pump and rotatable between a plurality of control arm forward positions that correspond to the forward positions of the control device, a control arm neutral position that corresponds to the neutral position of the control device and a plurality of control arm reverse positions that correspond to the reverse positions of the control device.

8. The hydraulic drive apparatus of claim 7, wherein the second control device component is a return-to-neutral mechanism, comprising a return arm rotatably engaged to the hydraulic drive apparatus and a return-to-neutral spring engaged to the return arm and the hydraulic drive apparatus, wherein the return-to-neutral mechanism biases the control arm to the control arm neutral position.

9. The hydraulic drive apparatus of claim 1, wherein the second control device component is a control arm, engaged to the hydraulic pump and rotatable between a plurality of control arm forward positions that correspond to the forward positions of the control device, a control arm neutral position that corresponds to the neutral position of the control device and a plurality of control arm reverse positions that correspond to the reverse positions of the control device.

10. The hydraulic drive apparatus of claim 9, wherein the first control device component is a return-to-neutral mechanism, comprising a return arm rotatably engaged to the hydraulic drive apparatus, and a return-to-neutral spring engaged to the return arm and the hydraulic drive apparatus, wherein the return-to-neutral mechanism biases the control arm to the control arm neutral position.

11. A hydraulic drive apparatus comprising:
    a housing;
    a variable displacement hydraulic pump disposed within the housing;
    a trunnion arm movable to control the displacement of the hydraulic pump;
    a control arm attached to the trunnion arm;

a return-to-neutral mechanism attached to the housing comprising a bearing, the bearing engaged to the control arm and positioned to bias the control arm to a neutral position; and an actuator assembly attached to the control arm generally adjacent to an edge of the control arm, the actuator assembly comprising an actuator arm and a switch, wherein the actuator arm is selectively engaged to the bearing and movable between a first position, which causes the switch to enter a first state, and a second position, which allows the switch to maintain a second state;

wherein the bearing engages the actuator arm, causing the actuator arm to move to the first position, when the control arm is moved to the neutral position or any of a plurality of forward positions, and wherein the bearing disengages the actuator arm, allowing the actuator arm to move to the second position, when the control arm is moved to any of a plurality of reverse positions.

12. The hydraulic drive apparatus of claim 11, wherein the actuator arm has a profile generally similar to the profile of the edge of the control arm.

13. The hydraulic drive apparatus of claim 12, wherein the actuator arm is rotationally mounted on an actuator base, and wherein the actuator base limits the movement of the actuator arm by contact with the actuator arm.

14. The hydraulic drive apparatus of claim 13, wherein movement of the actuator arm is limited by a stop formed on the actuator base which interacts with walls formed in a pivot opening of the actuator arm.

15. The hydraulic drive apparatus of claim 11, further comprising an actuator arm bias spring fixedly positioned in an actuator base and engaged to the actuator arm, the actuator arm bias spring biasing the actuator arm to the second position.

16. The hydraulic drive apparatus of claim 15, wherein the switch is fixedly positioned on the actuator base and cooperates with the actuator base and actuator arm to retain the actuator arm bias spring in the actuator base.

17. The hydraulic drive apparatus of claim 11, wherein an actuator base is attached to and cooperates with the control arm to retain the actuator arm and the switch.

18. The hydraulic drive apparatus of claim 11, further comprising an actuator base wherein an actuator arm bias spring is retained on the actuator base by ridges and the actuator arm is rotatably mounted on the actuator base.

19. The hydraulic drive apparatus of claim 11, wherein the profile of the control arm and the profile of the actuator arm are curvilinear.

20. A hydraulic drive apparatus comprising:
a housing;
a variable displacement hydraulic pump disposed within the housing;
a trunnion arm movable to control the displacement of the hydraulic pump;
a control arm mounted on the trunnion arm and moveable among a neutral position, a plurality of reverse positions and a plurality of forward positions, the control arm comprising a bearing;
a return arm attached to the housing, wherein the return arm is engaged to the bearing to bias the control arm to the neutral position; and
an actuator assembly attached to the return arm generally adjacent to an edge of the return arm, the actuator assembly comprising an actuator arm and a switch, wherein the actuator arm is selectively engaged to the bearing and movable between a first position, which causes the switch to enter a first state, and a second position, which allows the switch to maintain a second state;

wherein the bearing engages the actuator arm, causing the actuator arm to move to the first position when the control arm is moved to the neutral position or any of the plurality of forward positions, and wherein the bearing disengages the actuator arm, allowing the actuator arm to move to the second position, when the control arm is moved to any of the plurality of reverse positions.

21. The hydraulic drive apparatus of claim 20, wherein the actuator arm has a profile generally similar to the profile of the edge of the return arm.

22. The hydraulic drive apparatus of claim 20, wherein the actuator arm is rotatably mounted on an actuator base, and wherein the actuator base limits the movement of the actuator arm by contact with the actuator arm.

23. The hydraulic drive apparatus of claim 20, wherein an actuator arm bias spring is fixedly positioned in the actuator arm, and the actuator arm cooperates with an actuator base to retain the bias spring in the actuator arm.

24. The hydraulic drive apparatus of claim 20, wherein the profile of the actuator arm is biased to a position that is misaligned with the profile of the return arm by an actuator bias spring when the bearing is disengaged from the actuator arm.

25. The hydraulic drive apparatus of claim 24, wherein the actuator bias spring is retained on the actuator arm by ridges.

26. The hydraulic drive apparatus of claim 20, wherein the profile of the return arm and the profile of the actuator arm are linear.

27. A hydraulic drive apparatus mounted on a vehicle comprising an operating system having a first and a second operating state, the hydraulic drive apparatus comprising:
a housing;
a hydraulic pump located within the housing;
a control device, at least a portion of which is coupled to the hydraulic pump to control the hydraulic pump fluid flow, the control device movable to a neutral position, a plurality of reverse positions, and a plurality of forward positions, the control device comprising:
a first rotatable arm having a profile;
a second arm rotatable with respect to the first rotatable arm and having a bearing mounted thereon; and
a switch mounted on the first rotatable arm and connected to the operating system,
wherein the bearing moves along the profile and selectively engages the switch, wherein the switch causes the operating system to be in the first operating state when the bearing is disengaged from the switch and the switch causes the operating system to be in the second operating state when the bearing moves along the profile to engage the switch.

28. The hydraulic drive apparatus of claim 27, wherein the first rotatable arm is a control arm and the second arm is a return arm, and the bearing interacts with the profile of the control arm to bias the control arm to the neutral position.

29. The hydraulic drive apparatus of claim 27, wherein the first rotatable arm is a return arm and the second arm is a control arm, and the bearing interacts with the profile of the return arm to bias the control arm to the neutral position.

* * * * *